(12) United States Patent
Pham et al.

(10) Patent No.: US 6,601,397 B2
(45) Date of Patent: Aug. 5, 2003

(54) DIGITAL SCROLL CONDENSING UNIT CONTROLLER

(75) Inventors: Hung M. Pham, Dayton, OH (US); Richard P. Vogh, III, Marietta, GA (US); Nagaraj Jayanth, Sidney, OH (US)

(73) Assignee: Copeland Corporation, Sidney, OH (US)

( * ) Notice: Subject to any disclaimer, the term of this patent is extended or adjusted under 35 U.S.C. 154(b) by 8 days.

(21) Appl. No.: 09/811,092

(22) Filed: Mar. 16, 2001

(65) Prior Publication Data

US 2002/0157409 A1 Oct. 31, 2002

(51) Int. Cl.$^7$ .............................................. F25D 17/00
(52) U.S. Cl. ........................... 62/181; 62/228.3; 62/62; 62/196.3
(58) Field of Search .............................. 62/228.3, 505, 62/228.5, 181

(56) References Cited

U.S. PATENT DOCUMENTS

| | | | | |
|---|---|---|---|---|
| 2,296,822 A | * | 9/1942 | Wolfert | 236/1 EA |
| 3,513,662 A | * | 5/1970 | Golber | 62/175 X |
| 4,102,150 A | | 7/1978 | Kountz | 62/209 |
| 4,112,703 A | | 9/1978 | Kountz | 62/211 |
| 4,132,086 A | | 1/1979 | Kountz | 62/209 |
| 4,151,725 A | | 5/1979 | Kountz et al. | 62/182 |
| 4,420,947 A | | 12/1983 | Yoshino | 62/160 |
| 4,467,613 A | | 8/1984 | Behr et al. | 62/115 |
| 4,540,040 A | | 9/1985 | Fukumoto et al. | 62/226 |
| 4,555,910 A | | 12/1985 | Sturges | 62/184 |
| 4,787,213 A | | 11/1988 | Gras et al. | 62/212 |
| 4,838,037 A | | 6/1989 | Wood | 62/225 |
| 4,856,286 A | | 8/1989 | Sulfstede et al. | 62/89 |
| 4,928,750 A | | 5/1990 | Nurczyk | 236/49.3 X |
| 4,974,427 A | | 12/1990 | Diab | 62/505 |
| 5,009,074 A | | 4/1991 | Goubeaux et al. | 62/115 |
| 5,018,357 A | | 5/1991 | Livingstone et al. | 62/6 |
| 5,022,234 A | | 6/1991 | Goubeaux et al. | 62/228.5 |
| 5,088,297 A | | 2/1992 | Maruyama et al. | 62/228.5 |
| 5,099,654 A | | 3/1992 | Baruschke et al. | 62/180 |
| 5,203,179 A | | 4/1993 | Powell | 62/180 |
| 5,226,472 A | | 7/1993 | Benevelli et al. | 62/217 X |
| 5,284,026 A | | 2/1994 | Powell | 62/209 |
| 5,415,008 A | | 5/1995 | Bessler | 62/212 |
| 5,423,192 A | | 6/1995 | Young et al. | 62/228.4 |
| 5,426,952 A | | 6/1995 | Bessler | 62/211 |
| 5,431,026 A | | 7/1995 | Jaster | 62/221 |
| 5,435,145 A | | 7/1995 | Jaster | 62/115 |
| 5,483,141 A | | 1/1996 | Uesugi | 318/811 |
| 5,519,301 A | | 5/1996 | Yoshida et al. | 318/811 |
| 5,546,756 A | | 8/1996 | Ali | 62/204 |
| 5,546,757 A | | 8/1996 | Whipple, III | 62/225 |
| 5,655,379 A | | 8/1997 | Jaster et al. | 62/210 |
| 5,655,380 A | | 8/1997 | Calton | 62/228.3 |
| 5,694,010 A | | 12/1997 | Oomura et al. | 318/254 |
| 5,715,704 A | | 2/1998 | Cholkeri et al. | 62/527 |
| 5,752,385 A | | 5/1998 | Nelson | 62/6 |
| 5,904,049 A | | 5/1999 | Jaster et al. | 62/204 |
| 5,947,693 A | | 9/1999 | Yang | 417/45 |
| 5,953,490 A | | 9/1999 | Wiklund et al. | 388/811 |
| 6,038,871 A | | 3/2000 | Gutierrez et al. | 62/133 |
| 6,047,557 A | | 4/2000 | Pham et al. | 62/228.5 |
| 6,153,993 A | | 11/2000 | Oomura et al. | 318/434 |
| 6,191,545 B1 | | 2/2001 | Kawabata et al. | 318/439 |
| 6,213,731 B1 | * | 4/2001 | Doepker et al. | 417/310 |
| 6,240,733 B1 | | 6/2001 | Brandon et al. | 62/129 |
| 6,240,736 B1 | * | 6/2001 | Fujita et al. | 62/505 X |
| 6,244,061 B1 | | 6/2001 | Takagi et al. | 62/229 |
| 6,266,968 B1 | | 7/2001 | Redlich | 62/204 |
| 6,290,043 B1 | | 9/2001 | Ginder et al. | 417/319 |

* cited by examiner

Primary Examiner—William Wayner
(74) Attorney, Agent, or Firm—Harness, Dickey & Pierce, P.L.C.

(57) ABSTRACT

A cooling system controller controls the capacity of a variable capacity compressor based upon the temperature of a housing being cooled, the suction pressure of the compressor or both of these criteria. The cooling system controller is capable of controlling either single-evaporator or multiple-evaporator refrigeration systems. The multiple-evaporator systems can have evaporators of similar temperatures or of mixed temperatures. The controller also allows the use of one or more condenser fans that are operated in a lead/lag fashion to control the cooling capability of the system.

49 Claims, 11 Drawing Sheets

DIGITAL SCROLL CONDENSING UNIT CONTROLLER

FIELD OF THE INVENTION

The present invention relates generally to a controller for a condensing unit for a refrigeration system or for other cooling systems. More particularly, the present invention relates to a condensing unit employing a variable capacity compressor which is controlled by pulse width modulation using a variable duty cycle signal derived from one or more system sensors. The condensing unit controller is capable of controlling a single evaporator or multiple evaporators of similar or mixed temperatures.

BACKGROUND AND SUMMARY OF THE INVENTION

The present invention is being described associated with a refrigeration system. It is to be understood that the condensing unit of the present invention could be utilized for any other cooling system if desired.

Conventionally, refrigeration systems for refrigeration cases have employed air-cooled or water-cooled condensers fed by a rack of compressors. The compressors are coupled in parallel so that they may be switched on and off in stages to adjust the system cooling capacity to the demands of the load. Typically, the compressors and condensers are located outside of the building on the roof or in a machine room adjacent the area where the refrigeration cases are located.

Within each refrigeration case is an evaporator fed by refrigerant lines from the condensers through which the expanded refrigerant circulates to cool the case. Typically, a closed-loop control system regulates refrigerant flow through the evaporators to maintain the desired case temperatures. Proportional-Integral-Derivative (PID) closed loop control systems are popular for this purpose, with temperature and/or pressure sensors providing the sensed condition inputs.

It is common practice with retail outlets to use separate systems to supply different individual cooling temperature ranges; low temperature (for frozen foods, ice cream, nominally −25 F.); medium temperature (for meat, dairy products, nominally +20 F.); and high temperature (for floral, produce, nominally +35 to +40 F.). The separate low, medium and high temperature systems are each optimized to their respective temperature ranges. Normally, each will employ its own rack of compressors and its own set of refrigerant conduits to and from the compressors, condensers and evaporators.

The conventional arrangement, described above, is very costly to construct and maintain. Much of the cost is associated with the long refrigerant conduit runs. Not only are long conduit runs expensive in terms of hardware and installation costs, but the quantity of refrigerant required to fill the conduits is also a significant cost factor. The longer the conduit run, the more refrigerant required. Adding to these added costs are environmental factors. Eventually fittings leak, allowing the refrigerant to escape to the atmosphere. Invariably, long conduit runs involve more conduit joints that may potentially leak. When a leak does occur, the longer the conduit run, the more refrigerant lost.

One solution to the above described problems is disclosed in Assignee's U.S. Pat. No. 6,047,557, the disclosure of which is incorporated herein by reference. The solution presented in the above patent is a distributed refrigeration system in which the condenser is disposed on the refrigeration case and serviced by a special pulse-width modulated compressor that may be also disposed within the case. If desired, the condenser and compressor can be coupled to service a group of adjacent refrigerant cases, each case having its own evaporator. Further, multiple compressors with at least one pulse-width modulated compressor can be used to handle large evaporator load line-up. Also, the condenser can be disposed in a housing with the evaporator to provide a self-contained package, or can be disposed remotely, as in a split system. The pulse-width modulated compressor is driven by a control system that supplies a variable duty cycle control signal based on measured system load.

While the above described pulse-width modulated compressor and refrigeration system have performed satisfactorily, the continued development of these systems has been directed toward controlling the capacity of the compressor, the condenser and other components within the condensing unit.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
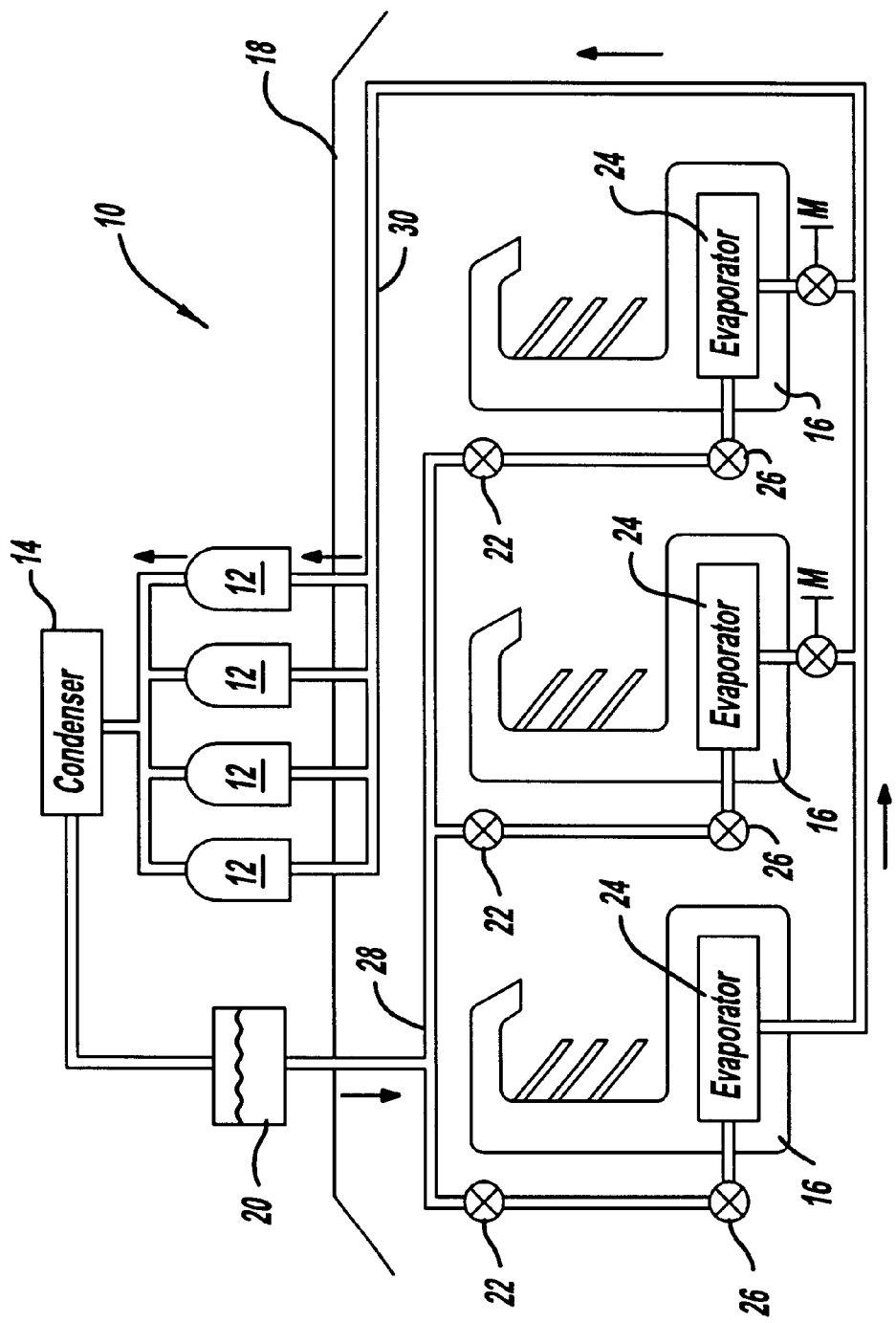
FIG. 1 is a system block diagram of a prior art refrigeration system configuration.

Referring now to the drawings in which like reference numerals designate like or corresponding parts throughout the several views, there is shown in FIG. 1 a conventional refrigeration system that is identified generally by reference numeral 10. Refrigeration system 10 includes a plurality of compressors 12 and a condenser 14 located remote from a plurality of refrigeration cases 16. In this illustration, compressors 12 are configured in a parallel bank located in a machine room or on a roof 18 of a building. Compressors 12 supply condenser 14 that may be air cooled or water cooled. Condenser 14 supplies liquid refrigerant to a receiver 20. Receiver 20, in turn, supplies refrigerant to the individual refrigeration cases 16, which are connected in parallel, as illustrated. In most implementations, a liquid line solenoid valve 22 is used to regulate the flow of refrigerant to the associated evaporator 24. The refrigerant is supplied to evaporator 24 through a suitable expansion device such as expansion valve 26. Expansion valve 26 provides a restricted orifice that causes the liquid refrigerant to atomize into liquid droplets that are introduced into the inlet side of evaporator 24. Evaporator 24, located within refrigerant case 16, extracts heat from case 16 and its contents by vaporization of the liquid droplets into a gas. Compressors 12 extract this gas by suction and compress the gas. The high-temperature compressed gas is then cooled by condenser 14 back into the liquid state and returned to receiver 20, whereupon the cycle continues.

To match cooling capacity to the load, compressors 12 may be switched on and off individually or in groups as required. In a typical retail outlet installation, there may be several independent systems, each configured as shown in FIG. 1, to handle different operating temperature ranges. Note that a liquid line 28 and a suction line 30 may each need to be quite lengthy (e.g., up to 150 feet) to span the distance from refrigeration cases 16 to a machine room or roof 18.

Figure 2:
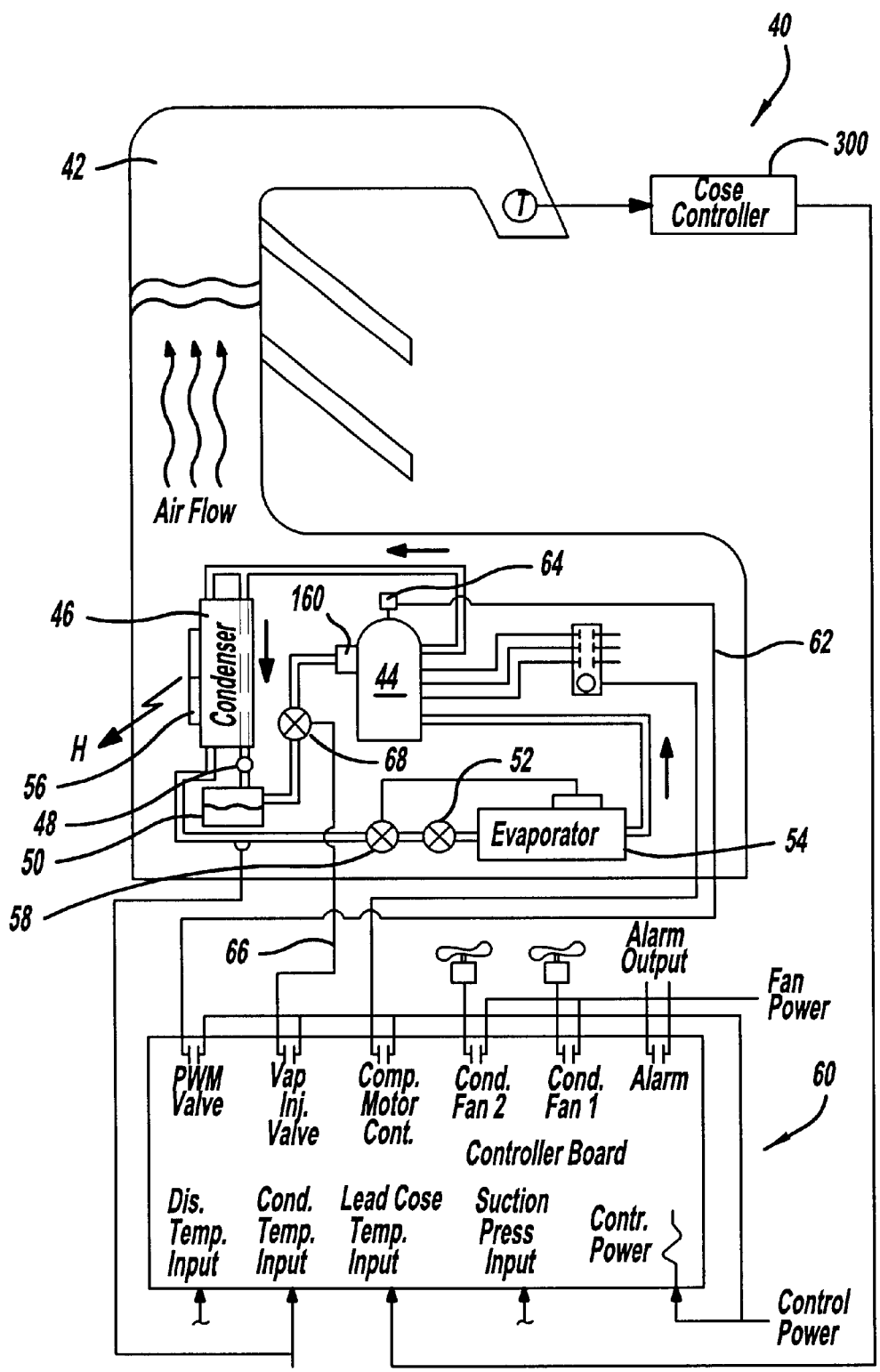
FIG. 2 is a system block diagram of a condensing unit or cooling system in accordance with the present invention.

FIG. 2 shows a condensing unit or cooling system 40 configured in accordance with the principles of the present invention. Cooling system 40 includes a refrigeration case 42, a compressor 44, a condenser 46, a first expansion valve 48, an economizer 50, a second expansion valve 52 and an evaporator 54. While cooling system 40 is being illustrated in conjunction with refrigeration case 42, it is within the scope of the present invention to use cooling system 40 in conjunction with other cooling devices if desired.

Condenser 46 and compressor 44 are both disposed within case 42 or attached thereto. Evaporator 54 and the associated expansion valves 48 and 52 are likewise disposed within case 42. Condenser 46 includes a heat removal mechanism 56 by which heat is transferred to ambient. Heat removal mechanism 56 can be a water jacket connected to suitable plumbing for carrying waste heat to a water cooling tower located on the building roof or elsewhere exterior to the building. Alternately, heat removal mechanism 56 can be a forced-air cooling system or a passive convection-air cooling system. Cooling system 40 also uses a liquid-line shut off valve 58 for controlling the flow of refrigerant to evaporator 54. Valve 58 communicates with control sensors to supply the refrigerant to evaporator 54 on demand.

Figure 12:
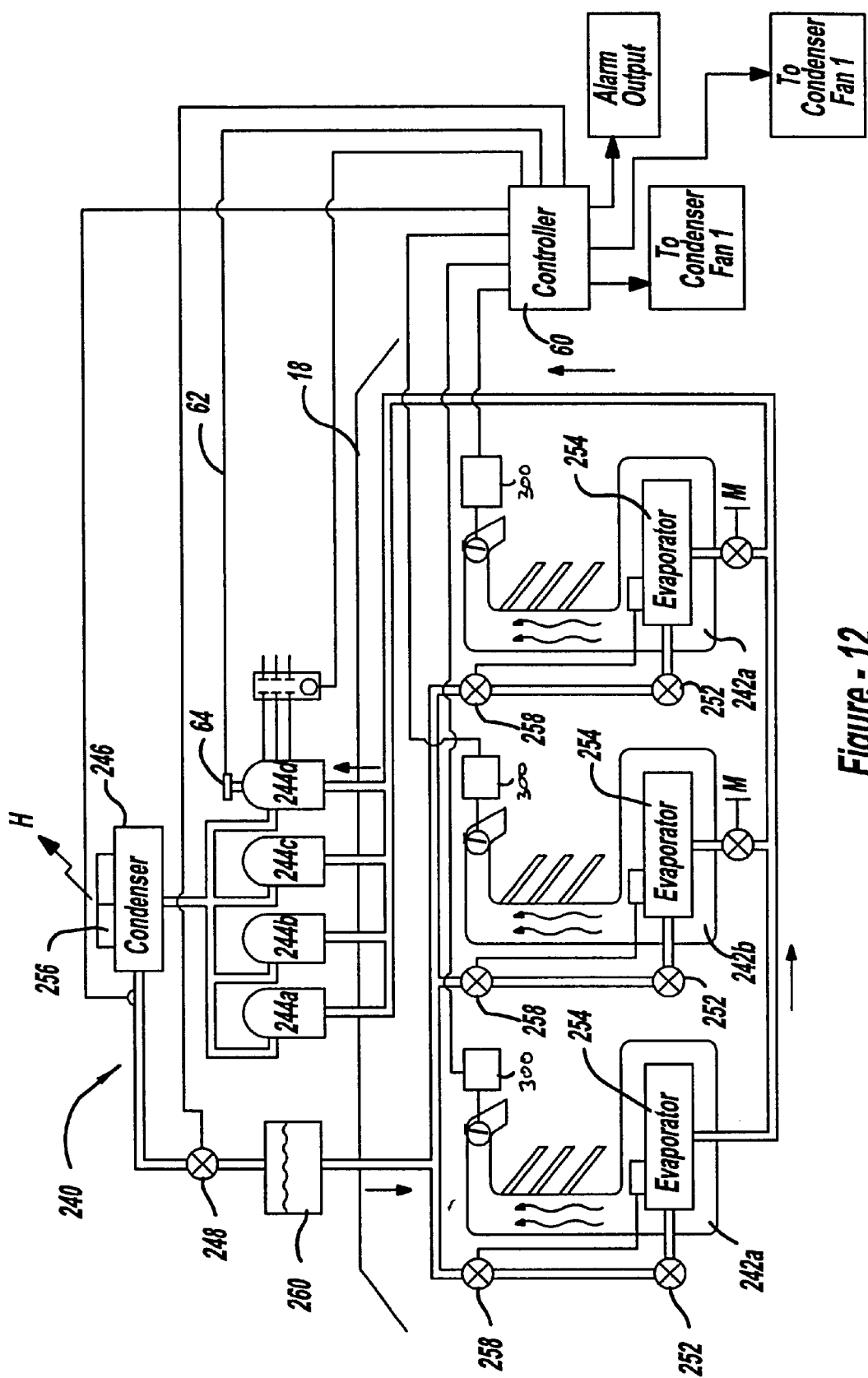
FIG. 12 is a system block diagram of a condensing unit or cooling system in accordance with an alternative embodiment of the present invention.

FIG. 12 shows an alternative embodiment of a condensing unit or cooling system 240 configured in accordance with the principles of the present invention. Cooling system 240 includes a series of refrigeration cases 242a, 242b and 242c, as well as a group of compressors 244a, 244b, 244c and 244d. The group of compressors 244a–d includes at least one pulse-width modulated compressor 244d. Cooling system 240 is a split system wherein compressors 244a–d are on a roof or in a machine room 18 of a building, while refrigeration cases 242a–c are disposed in a retail area of the building. In machine room 18 along with compressors 244a–d are a condenser 246, a first expansion valve 248, and an economizer 250. Along with the refrigeration cases 242a–c, cooling system 240 includes a second expansion valve 252 and an evaporator 254. While cooling system 240 is illustrated in FIG. 12 in conjunction with refrigeration cases 242a–c, it is within the scope of the present invention to use cooling system 240 in conjunction with other cooling devices it desired.

Condenser 246 includes a heat removal mechanism 256 by which heat is transferred to ambient. Heat removal mechanism 256 can be a water jacket connected to suitable plumbing for carrying waste heat to a water cooling tower located on the building roof or elsewhere exterior to the building. Alternatively, heat removal mechanism 256 can be a forced-air cooling system or a passive convection-air cooling system. Cooling system 240 also uses a liquid-lined shut-off valve 258 for controlling the flow of refrigerant to each evaporator 254. Valve 258 communicates with control sensors to supply the refrigerant to evaporator 254 on demand.

Cooling system 240, like cooling system 40, employs the compressor controller 60 to supply a pulse-width modulated control signal on a capacity signal line 62 to a capacity solenoid valve 64 for compressor 244d. Again, controller 60 adjusts the pulse width of the control signal for valve 64 using an algorithm described below. While only one pulse-width modulated compressor 244d is shown in FIG. 12, more compressors can include a capacity solenoid valve 64 for pulse-width modulation by controller 60. Further, while not shown in FIG. 12, controller 60 may also supply a pulse-width modulated vapor-injection signal on an injection signal line to an injection solenoid valve for any of compressors 244a–d. Controller 60 adjusts the pulse width of the control signal for the injection solenoid valve using an algorithm described below.

Cooling system 40 employs a condensing unit or system controller 60 that supplies a pulse-width modulated control signal on a capacity signal line 62 to a capacity solenoid valve 64 for compressor 44. Controller 60 adjusts the pulse width of the control signal for valve 64 using an algorithm described below. Controller 60 also supplies a pulse-width modulated vapor-injection signal on an injection signal line 66 to an injection solenoid valve 68 for compressor 44. Controller 60 adjusts the pulse width of the control signal for valve 68 using an algorithm described below.

Figure 3:
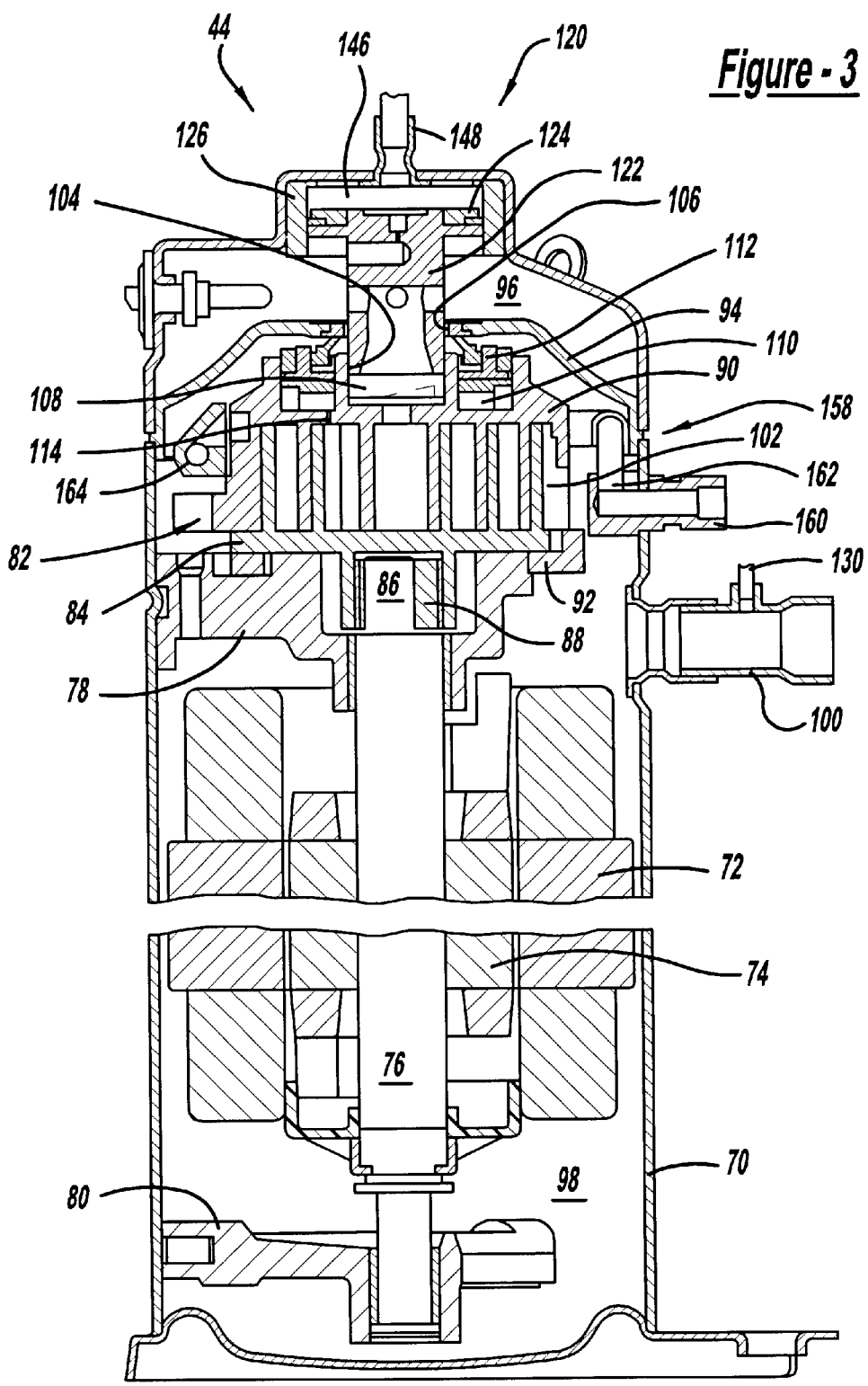
FIG. 3 is a cross-sectional view of an embodiment of a pulse-width modulated compressor shown in the loaded state.
Figure 4:
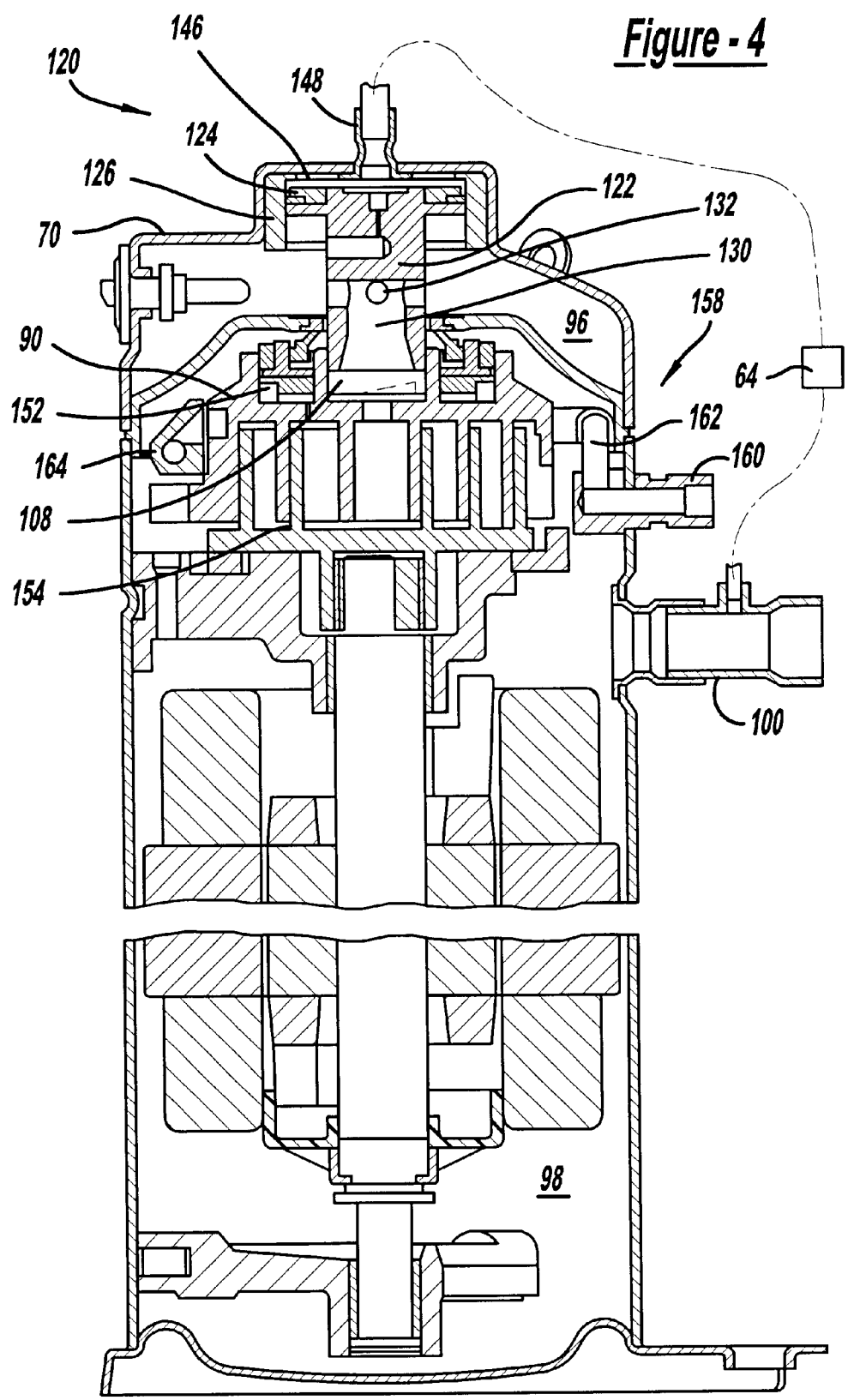
FIG. 4 is a cross-sectional view of the compressor of FIG. 3, shown in the unloaded state.

FIGS. 3 and 4 show the details of compressor 44. Scroll compressor 44 comprises an outer shell 70 within which is disposed a driving motor including a stator 72 and a rotor 74, a crankshaft 76 to which rotor 74 is secured, an upper bearing housing 78 and a lower bearing housing 80 for rotatably supporting crankshaft 76 and a compressor assembly 82.

Compressor assembly 82 includes an orbiting scroll member 84 supported on upper bearing housing 78 and drivingly connected to crankshaft 76 via a crankpin 86 and a drive bushing 88. A non-orbiting scroll member 90 is positioned in meshing engagement with orbiting scroll member 84 and is axially movably secured to upper bearing housing 78 by means of a plurality of bolts (not shown) and associated sleeve members (not shown). An Oldham coupling 92 cooperates with scroll members 84 and 90 to prevent relative rotation therebetween. A partition plate 94 is provided adjacent the upper end of shell 70 and serves to divide the interior of shell 70 into a discharge chamber 96 at the upper end thereof and a suction chamber 98 at the lower end thereof.

In operation, as orbiting scroll member 84 orbits with respect to scroll member 90, suction gas is drawn into suction chamber 98 of shell 70 via a suction fitting 100. From suction chamber 98, suction gas is sucked into compressor 82 through an inlet 102 provided in non-orbiting scroll member 90. The intermeshing scroll wraps provided on scroll members 84 and 90 define moving pockets of gas that progressively decrease in size as they move radially inwardly as a result of the orbiting motion of scroll member 84, thus compressing the suction gas entering via inlet 102. The compressed gas is then discharged into discharge chamber 96 via a discharge port 104 provided in non-orbiting scroll member 90 and a passage 106 formed in partition 94. A pressure responsive discharge valve 108 is preferably seated within discharge port 104.

Non-orbiting scroll member 90 is also provided with an annular recess 110 formed in the upper surface thereof. A floating seal 112 is disposed within recess 110 and is biased by intermediate pressurized gas against partition 94 to seal suction chamber 98 from discharge chamber 96. A passage 114 extends through non-orbiting scroll member 90 to supply the intermediate pressurized gas to recess 110.

A capacity control system 120 is shown in association with compressor 44. Control system 120 includes a discharge fitting 122, a piston 124, a shell fitting 126 and solenoid valve 64. Discharge fitting 122 is threadingly received or otherwise secured within discharge port 104. Discharge fitting 122 defines an internal cavity 130 and a plurality of discharge passages 132. Discharge valve 108 is disposed below fitting 122 and below cavity 130. Thus, pressurized gas overcomes the biasing load of discharge valve 108 to open discharge valve 108 and allowing the pressurized gas to flow into cavity 130, through passages 132, and into discharge chamber 96.

Figure 5:
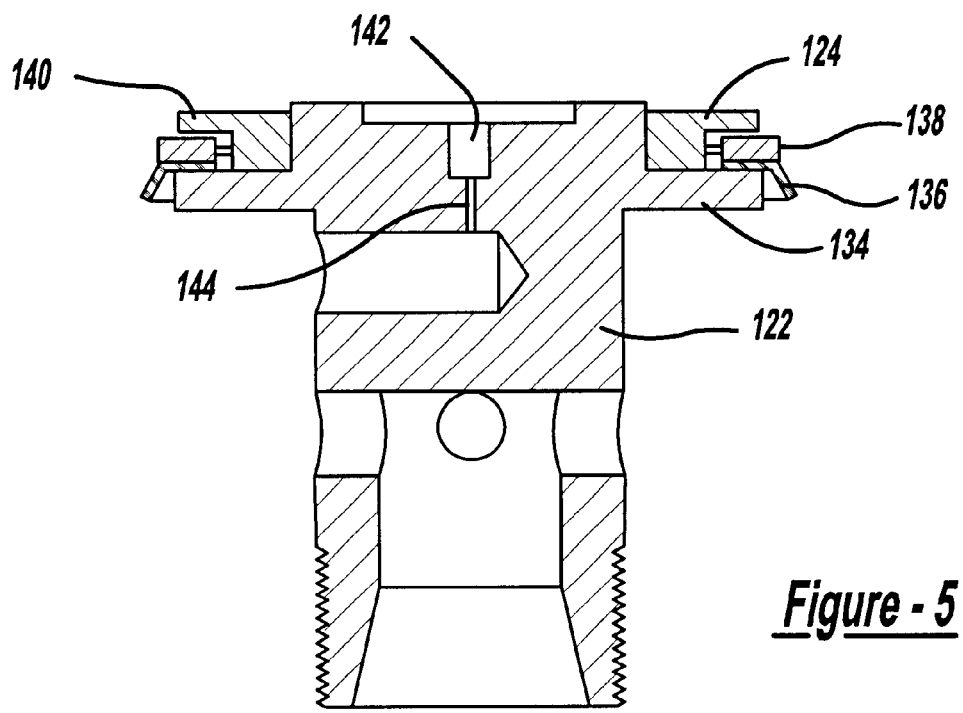
FIG. 5 is a vertical cross-sectional view of the piston assembly shown in FIGS. 3 and 4.

Referring now to FIGS. 3, 4 and 5, the assembly of discharge fitting 122 and piston 124 is shown in greater detail. Discharge fitting 122 defines an annular flange 134. Seated against flange 134 is a lip seal 136 and a floating retainer 138. Piston 124 is press fit or otherwise secured to discharge fitting 122 and piston 124 defines an annular flange 140 that sandwiches seal 136 and retainer 138 between flange 140 and flange 134. Discharge fitting 122 defines a passageway 142 and an orifice 144 that extends through discharge fitting 122 to fluidically connect discharge chamber 96 with a pressure chamber 146 defined by discharge fitting 122, piston 124, seal 136, retainer 138 and shell 70. Shell fitting 126 is secured within a bore defined by shell 70 and slidingly receives the assembly of discharge fitting 122, piston 124, seal 136 and retainer 138. Pressure chamber 146 is fluidically connected to solenoid 64 by a tube 148 and with suction fitting 100 and thus suction chamber 98 through a tube 150. The combination of piston 124, seal 136 and floating retainer 138 provides a self-centering sealing system to provide accurate alignment with the internal bore of shell fitting 126. Seal 136 and floating retainer 138 include sufficient radial compliance such that any misalignment between the internal bore of fitting 126 and the internal bore of discharge port 104 within which discharge fitting 122 is secured is accommodated by seal 136 and floating retainer 138.

In order to bias non-orbiting scroll member 90 into sealing engagement with orbiting scroll member 84 for normal full-load operation, solenoid valve 64 is deactivated (or it is activated) by controller 60 to block fluid flow between tube 148 and tube 150. In this position, chamber 146 is in communication with discharge chamber 96 through passageway 142 and orifice 144. The pressurized fluid at discharge pressure within chambers 96 and 146 will act against opposite sides of piston 124, thus allowing for the normal biasing of non-orbiting scroll member 90 towards orbiting scroll member 84 to sealingly engage the axial ends of each scroll member with the respective end plate of the opposite scroll member. The axial sealing of the two scroll members 84 and 90 causes compressor 44 to operate at 100% capacity.

In order to unload compressor 44, solenoid valve 64 will be actuated (or it will be deactuated) by controller 60 to the position shown in FIG. 4. In this position, suction chamber 98 is in direct communication with chamber 146 through suction fitting 100, tube 150, solenoid valve 64 and tube 148. With the discharge pressure pressurized fluid released to suction from chamber 146, the pressure difference on opposite sides of piston 124 will move non-orbiting scroll member 90 upward to separate the axial end of the tips of each scroll member with its respective end plate and the higher pressurized pockets will bleed to the lower pressurized pockets and eventually to suction chamber 98. Orifice 144 is incorporated to control the flow of discharge gas between discharge chamber 96 and chamber 146. Thus, when chamber 146 is connected to the suction side of the compressor, the pressure difference on opposite sides of piston 124 will be created. A wave spring 152 is incorporated to maintain the sealing relationship between floating seal 112 and partition 94 during modulation of non-orbiting scroll member 90. When a gap 154 is created between scrolls 84 and 92, the continued compression of the suction gas will be eliminated. When this unloading occurs, discharge valve 108 will move to its closed position, thereby preventing the backflow of high pressurized fluid from discharge chamber 96 on the downstream refrigeration system. When compression of the suction gas is to be resumed, solenoid valve 64 will be deactuated (or it will be actuated) to again block fluid flow between tubes 148 and 150 allowing chamber 146 to be pressurized by discharge chamber 96 through passageway 142 and orifice 144.

Figure 6:
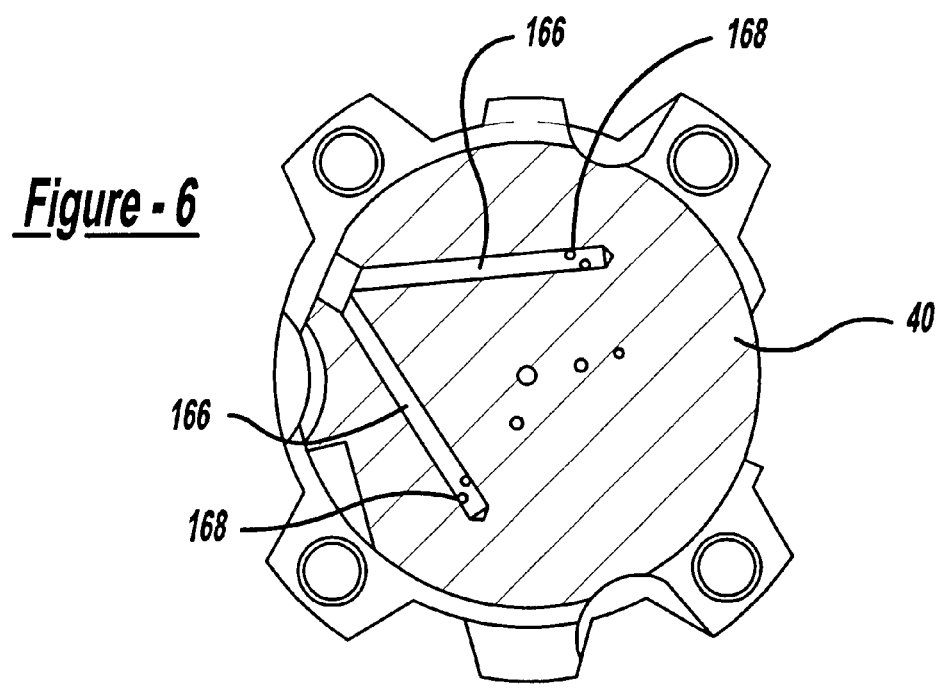
FIG. 6 is a cross-sectional top view of the non-orbiting scroll shown in FIGS. 3 and 4.

Referring now to FIGS. 3, 4 and 6, a fluid injection system 158 for compressor 44 is shown in greater detail. Compressor 44 includes the capability of having fluid injected into the intermediate pressurized moving chambers at a point intermediate suction chamber 98 and discharge chamber 96. A fluid-injection fitting 160 extends through shell 70 and is fluidically connected to an injection tube 162, which is in turn fluidically connected to an injection fitting 164 secured to non-orbiting scroll member 90. Non-orbiting scroll member 90 defines a pair of radial passages 166, each of which extend between injection fitting 164 and a pair of axial passages 168. Axial passages 168 are open to the moving chambers on opposite sides of non-orbiting scroll member 90 of compressor assembly 82 to inject the fluid into these moving chambers as required by controller 60.

FIG. 2 illustrates vapor injection system 158, which provides the fluid for the fluid injection system of compressor 44. Compressor 44 is shown in a cooling system including condenser 46, first expansion valve or throttle 48, economizer 50, a second expansion valve or throttle 52, an evaporator 54 and a series of piping interconnecting the components as shown in FIG. 2. Compressor 44 is operated by the motor to compress the refrigerant gas. The compressed gas is then liquefied by condenser 46. The economizer 50 can be a flash-tank or heat-exchanger type economizer. As shown, the liquefied refrigerant passes through expansion valve 48 to flash-tank type economizer 50 where it is separated into gas and liquid. The gaseous refrigerant further passes through additional piping to be introduced into compressor 44 through fitting 160. On the other hand, the remaining liquid refrigerant further expands in expansion valve 52, is then vaporized in evaporator 54 and is again taken into compressor 44.

Referring again to FIG. 2, the incorporation of flash-tank economizer 50 and the remainder of the vapor injection system allows the capacity of the compressor 44 to increase above the fixed capacity of compressor 44. Typically, at standard refrigeration conditions, the capacity of the compressor 44 can be increased by approximately 30% to provide a compressor with 130% of its capacity. In order to be able to control the capacity of compressor 44, solenoid valve 68 is positioned between economizer 50 and fitting 160. The increased capacity of compressor 44 can be controlled by controller 60, which operates solenoid valve 68 either in a pulse width injection or continuous injection mode. Solenoid valve 68, when operated in a pulse width modulation mode, in combination with capacity control system 120 of compressor 44 allows the capacity of compressor 44 to be positioned anywhere between 0% and 130% of its fixed capacity to accommodate faster load pull down.

Figure 7:
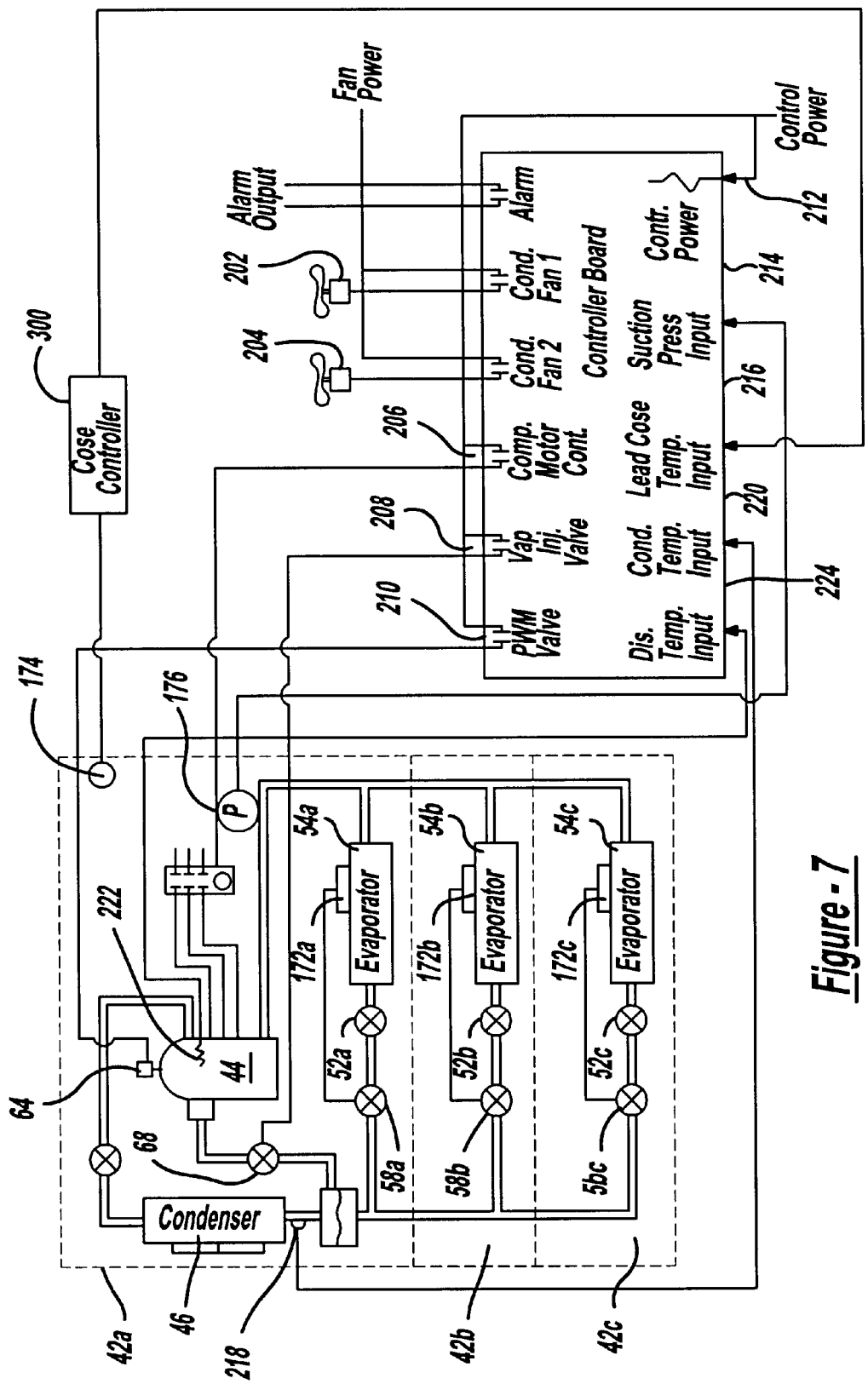
FIG. 7 is another embodiment of a condensing unit or cooling system in accordance with the present invention.

Referring to FIG. 7, a single compressor 44 and condenser 46 can service several distributed refrigeration cases or several distributed cooling units in a heating and cooling (HVAC) system. In FIG. 7, the refrigeration cases or cooling system housings are shown as dashed boxes designated 42a, 42b and 42c. Conveniently, compressor 44 and condenser 46 may be disposed within or attached to one of the refrigeration cases or housings, such as refrigerant case or housing 42a or disposed remotely, such as in a split system as shown in FIG. 12, wherein the compressor 46 and condenser 44 are in a machine room or in a building roof 18. Each refrigeration case or housing has its own evaporator and associated second expansion valve as illustrated at 54(a, b, c) and 52(a, b, c) as well as a liquid line shut off valve 58(a, b, c) and a thermostat 172(a, b, c), which controls a respective liquid line shut off valve 58(a, b, c). In addition, one of the refrigeration cases or housings, typically the lowest temperature case or housing, may have a temperature sensor 174 as illustrated for refrigeration case or housing 42a. When temperature sensor 174 is included, it supplies output information to controller 60 as described below. Finally, a pressure sensor 176 can be included which monitors the pressure of the refrigerant entering suction fitting 100. Pressure sensor 176 supplies this information to controller 60 as described below.

Figure 11:
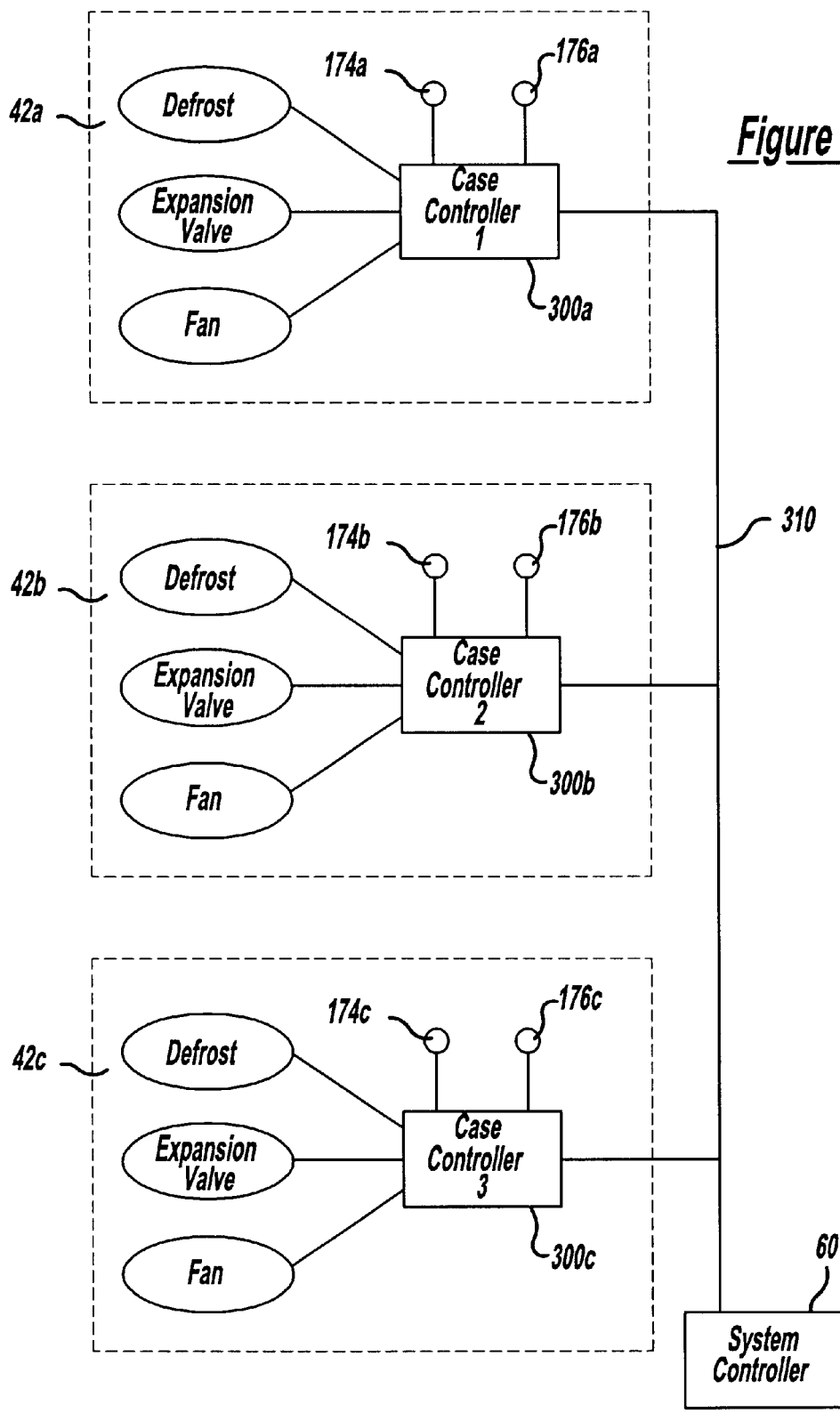
FIG. 11 is a schematic view illustrating a case controller and system controller in accordance with the present invention.

Alternatively, each evaporator 54 can have its own case controller 300 to perform defrost, fan, and electronic expansion valve control based on the case temperature and case outlet pressure, as shown in FIGS. 2, 7 and 11. Referring specifically to FIG. 11, a group of refrigeration cases 42a, 42b, 42c each included a case controller 300a, 300b, 300c, respectively. Temperature sensors 174a, 174b and 174c and pressure sensors 176a, 176b and 176c provide temperature and case outlet pressure measurements to the respective case controllers 300a, 300b and 300c. The case controllers 300a, 300b and 300c are connected via a digital two-way communication path 310 to the system controller 60, whereby temperature and pressure sensor values and case demand loading state (1 or 0) can be provided to system controller 60 by case controllers 300a, 300b and 300c. Further, each case controller 300a, 300b and 300c performs defrost, electronic expansion valve, and fan control locally based on the receive temperature and pressure sensor values.

The multiple case or multiple cooling unit embodiment of FIG. 7 shows how a single compressor 44 can be pulse-width modulated for capacity control and vapor injection by controller 60 to supply the instantaneous demand for cooling. Temperature sensor 174 and/or pressure sensor 176 provide an indication of the load on the system. Controller 60 adjusts the pulse width modulation of both the capacity control system 120 and the vapor injection system to modulate the compressor between its high capacity and low capacity states to meet the instantaneous demand for refrigerant as described below.

Controller 60 is capable of controlling the capacity of compressor 44 by using pulse width modulation of solenoid valve 64. The capacity of compressor 44 can be controlled from 0% to 100% but for this embodiment, the capacity is modulated from 10% to 100% by pulse width modulation operation. In addition, the capacity of compressor 44 can be increased anywhere from 100% to approximately 130% by pulse width modulation of solenoid valve 68, which controls the vapor injection system of the present invention. It is also possible for controller 60 to operate solenoid valve 68 in an on/off manner if desired. The operational characteristics and algorithms incorporated into controller 60 are detailed below.

Controller 60 is capable of controlling either single-evaporator (FIG. 2) or multi-evaporator (FIG. 7) refrigeration systems. The multi-evaporator systems could have evaporators at similar temperatures or at mixed temperatures by employing electronic pressure regulators in the higher temperature evaporators.

Figure 8:
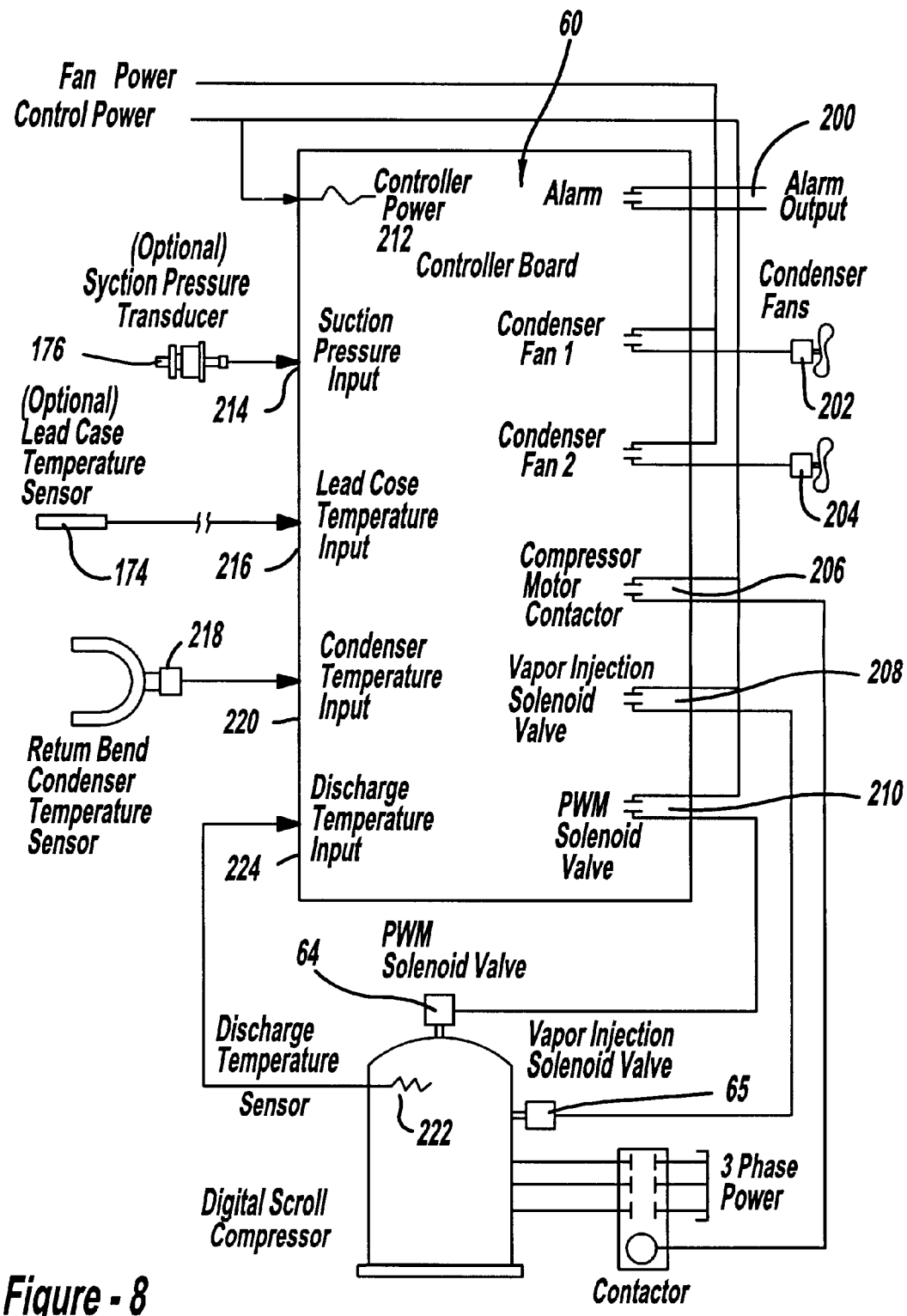
FIG. 8 is a schematic view illustrating the controller shown in FIG. 7.

Referring now to FIGS. 7 and 8, controller 60 is shown in greater detail. Controller 60 controls an alarm output 200 that will remain on during any alarm condition. Alarm output 200 will reset itself when all alarm conditions are gone.

Controller 60 controls the operation of a first condenser fan 202 and a second condenser fan 204. Cooling system 40 includes two condenser fan motors and fans for condenser 46. Controller 60 controls the operation of the motor for compressor 44 as shown at 206, it controls the operation of vapor injection solenoid valve 68 as shown at 208 and it controls the operation of capacity control solenoid valve 64 as shown at 210.

Various inputs are provided to controller 60. These inputs include control power at 212, an optional suction pressure input from pressure sensor 176 at 214, an optional load case temperature input from temperature sensor 174 at 216, the temperature of refrigerant at the mid-coil or the coil return of condenser 46 from a temperature sensor 218 at 220 and the temperature of the discharge gas of compressor 44 from a temperature sensor 222 at 224. Using the various inputs, controller 60 can control the capacity of compressor 44 based on either case air temperature, compressor suction pressure, or both as detailed below. Controller 60 and the various terminal blocks are housed in an enclosure (not shown) suitable for mounting on cooling system 40.

While not specifically detailed, cooling system 40 also includes a low pressure cutout electromechanical switch to stop compressor 44 at very low suction pressure for vacuum protection; and a high head pressure cutout electromechanical switch to stop compressor 44 at very high discharge pressure, if such protection is required. As detailed above, each evaporator 54(a, b, c) has associated with it their own liquid line solenoid valve 58(a, b, c), their own temperature sensors 172(a, b, c) and their own thermostatic expansion valve 52(a, b, c). None of these valves or sensors are in communication with controller 60. The only communication with controller 60 is through lead case temperature sensor 174 and/or suction pressure sensor 176. Finally, controller 60 is capable of being switched between refrigerants, including, but not limited to, R-404A, R-407C, R-22, R-134a and R-410A as detailed below.

Figure 9:
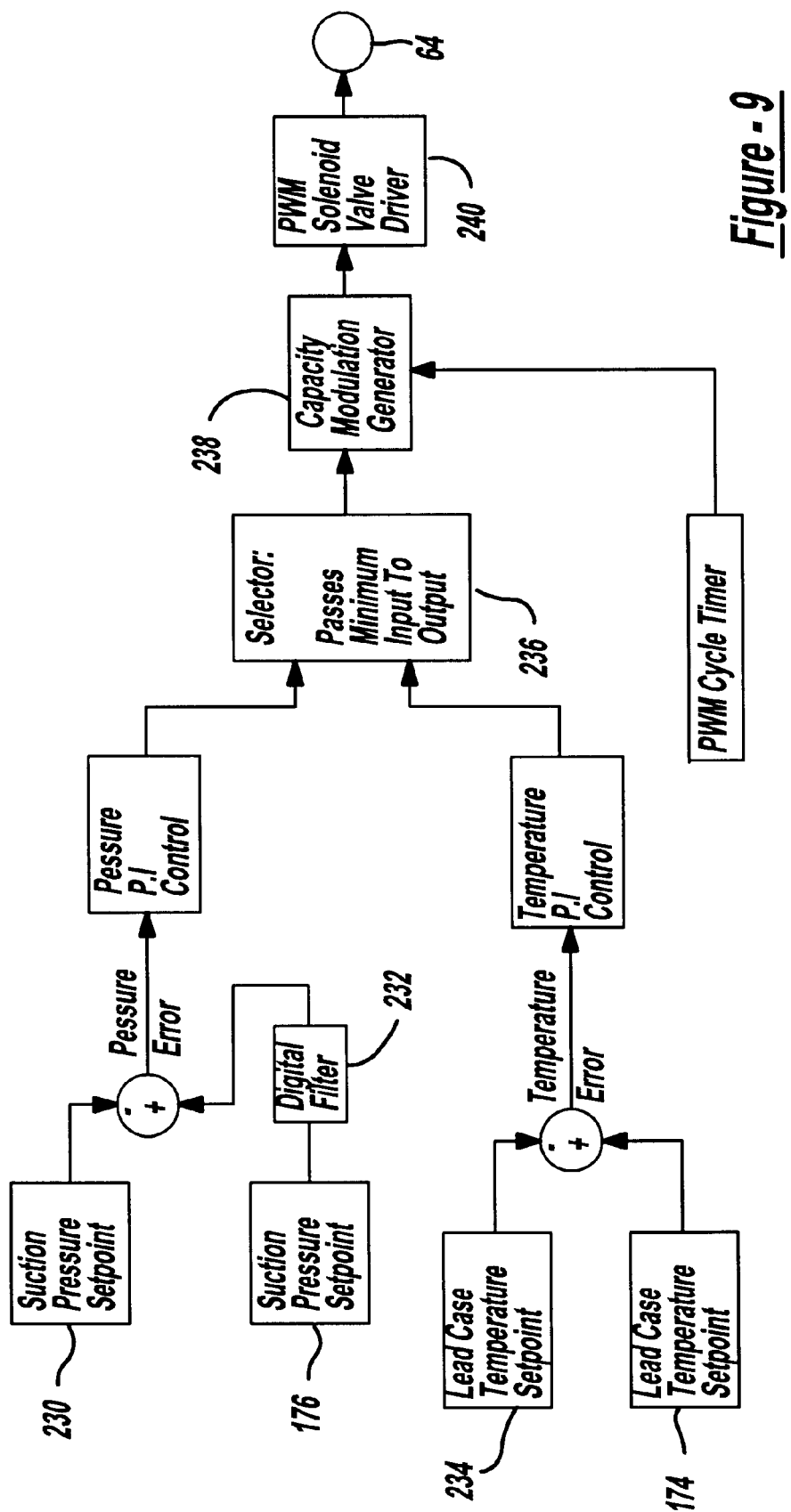
FIG. 9 is a flow diagram for the control system of the present invention.

Compressor Capacity Control Algorithms (FIG. 9)

Controller 60 modulates the capacity of compressor 44 through pulse width modulation control of solenoid valve 64 and/or solenoid valve 68. There are two different Proportional-Integral-Derivative control loops. Controller 60 can be set to use suction pressure control using sensor 176, lead case temperature control using sensor 174 or a combination of lead case temperature control with suction control backup using sensors 174 and 176. Each will be described in turn.

Suction Pressure Control: During suction pressure control, compressor 44 will be operated with the loading time adjusted to maintain an average suction pressure at a suction pressure set point 230. Determining the average suction pressure will be done by taking many samples of suction pressure during each load/unload cycle time of compressor 44 and then filtering this suction pressure data using a digital filter 232. The digital filter will produce a useful average pressure for control purposes by removing almost all of the pressure fluctuations caused by the loading and unloading of compressor 44. Preferably, the sampling rate of the digital filter will be inversely proportional to the pulse-width-modulation (PWM) cycle time so that regardless of the PWM cycle time selected, the digital filter will operate with twenty samples during each PWM cycle. The filtering thus achieved will have appropriate timing to match the PWM cycle time selected. Control of the suction pressure is by PID algorithm. The suction pressure set point is settable at controller 60 as described below. The signal from suction pressure sensor 176 is first routed through the digital filter and then to the suction pressure PID algorithm. If suction pressure control is chosen, then the lead case temperature PID algorithm is ignored.

Lead Case Temperature Control: During lead case temperature control, compressor 44 will be operated with the loading duty cycle percentage adjusted to maintain the temperature of air in the chosen lead case at a lead case temperature set point 234. Control of this lead case temperature will be by PID algorithm. The lead case temperature set point will be settable on controller 60 as described below. The signal from temperature sensor 174 will go directly to the lead case temperature PID algorithm. If lead case temperature control is chosen, the suction pressure PID algorithm will be ignored.

Combination Control: During combination control, compressor 44 will be operated to achieve both suction pressure set point 230 and lead case temperature set point 234. The capacity of compressor 44 will be increased until both of these set points are satisfied. The combination control is accomplished by allowing both suction pressure PID control and lead case temperature PID control to function simultaneously. Controller 60 gives dominance to whichever PID control calls for the lowest compressor capacity. The determination of which one controls will be recalculated during each unloaded cycle for compressor 44. The preferred intent of this combination control is that lead case temperature will be the dominant control most of the time, so it must require the lesser compressor capacity. Thus, the lead case temperature set point will usually be set to a slightly higher refrigeration temperature than the suction pressure set point by itself would achieve. The outputs of the two PID control functions (one for suction pressure and one for lead case temperature) will be combined in a selector 236 that will pass on the lesser of the two. The selector will supply the signal to a capacity modulation generator 238. The capacity modulation generator generates the timing of PWM solenoid valve 64 which is provided to a solenoid driver 240. The reason for preferring dominance of the lead case temperature is that if the suction pressure set point were set to achieve a lower temperature than the lead case temperature set point, then the suction pressure control would dominate and the temperature of the lead case would be held at a temperature lower than the lead case temperature set point. Such settings essentially disable the usefulness of the lead case temperature measurement. The presence of suction pressure control during a dominant lead temperature control is useful during defrosts of the lead case because the suction pressure is lower than the lead case temperature during defrost. In addition, the pressure of suction pressure sensor 176 enables better condenser control and better protection against short cycling the compressor motor when suction pressure goes too low. The combination control mode will have no inner loop and no outer loop. The two PID control paths are equals, both active, with selector 236 determining which has controlling effect at the moment.

To convert to pulse width modulation, the output of the selector algorithm of selector 236 will be converted to a duty cycle value of a repeating pulse by capacity modulation generator 238. The output of capacity modulation generator 238 will control solenoid valve 64 of compressor 44. More capacity will cause solenoid valve 64 to be energized (or de-energized) during a smaller proportion of the cycle time to increase compressor 44's capacity. The output capacity is calculated as follows:

$$\text{Output} = K_p * e(t) + K_i * \frac{1}{\pi} \int e(t)dt + K_d * \frac{d\,e(t)}{d\,t}$$

where e(t) is the error signal between the sensed value and the set point, $K_p$ is the proportional constant, $K_d$ is the derivative constant, and $K_i/\pi$ is the integral constant. The two PID (Proportional-Integral-Derivative) algorithms may be simplified to PI (Proportional-Integral) algorithms with no derivative function. In relation to the output equation above, the proportional and integral constants are divided by 100 to arrive at P and I as used here. PID (or PI) constants for the suction pressure control will be adjustable and they will have default values. There will also be minimum and maximum values, beyond which they cannot be set. Preferably, the default values are P=0.3, I=0.15; and the adjustment ranges are P=0.1 to 0.6, I=0.05 to 0.03. These PI constants for the lead case temperature control will be adjustable and they will have default values. There will also be minimum and maximum values, beyond which they cannot be set. Preferably, the default values are P=0.3, I=0.3; and the adjustment ranges are P=0.1 to 0.6, I=0.05 to 0.03.

The PWM maximum cycle time will be user selectable as described below. Preferably the default value will be 20 seconds, the minimum value will be 10 seconds and the maximum value will be 60 seconds.

A low compressor capacity limit is also provided. Even though the capacity of compressor 44 can be reduced to 0%, controller 60 will turn off the motor of compressor 44 if the required compressor capacity value goes below 10%. Restarting of the motor will be governed by the capacity requirement rising to 10% or more and by the motor start logic.

Control for low capacity with short PWM cycle time is also provided. The loaded time for compressor 44 will be controlled to be no less than two seconds. For a PWM maximum cycle time setting of twenty seconds (the default value) or more, this condition is met by the minimum loaded duty cycle of 10%. For a PWM maximum cycle time setting of less than twenty seconds (ten-twenty seconds), the PWM cycle time will be increased when the capacity is at a low value so that the minimum loaded time condition of two seconds is maintained. If the PWM maximum cycle time is set to ten seconds, then while PWM is 20% or more, the minimum loaded time of two seconds is satisfied. If the capacity decreased to 15%, then to maintain the minimum loaded time of two seconds, the PWM cycle time will increase automatically to thirteen and one-third seconds. (15% of thirteen and one-third seconds is two seconds). If capacity decreases to 10%, the PWM cycle time will increase automatically to twenty seconds (10% of twenty seconds is two seconds). When the calculated capacity is less than 10% (which causes the compressor motor to turn off), the PWM cycle time will not be increased beyond the time value for PWM at 10%. This permits other control functions to operate normally, so that the correct time to resume pumping can be determined by the control algorithms without excessive delay.

Vapor Injection

Controller 60 is programmed to operate injection solenoid valve 68. This will increase the capacity of compressor 44 to approximately 130%. Controller 60 will only operate solenoid valve 68 when capacity solenoid valve 64 is de-energized. Thus, before vapor injection by controller 60 can proceed, the capacity of compressor 44 must be at 100%. Controller 60 will then operate solenoid valve 68 using pulse width modulation to increase the capacity of compressor 44 from 100% up to approximately 130% depending on the requirements determined by controller 60.

Motor Start Logic

Delay—Controller 60 includes motor start logic which prohibits the compressor motor from being started until after an appropriate time delay. The time delay will begin at the most recent moment that the compressor motor was stopped. Preferably the compressor motor will have a start delay of two minutes and this delay time is not adjustable. This prevents more than thirty motor starts in any given hour.

Start Unloaded—Controller 60 includes additional motor start logic which unloads compressor 44 at the time of starting by energizing (or de-energizing) solenoid valve 64. The unloaded starting of the motor will reduce motor inrush current and enable more motor starts without excessive wear on the motor contactor. Preferably, solenoid valve 64 will be energized (or de-energized) one second before energizing the motor contactor to unload compressor 44 and it will remain energized (or de-energized) for three seconds after the motor starts keeping compressor 44 unloaded. After this unloaded running, control of solenoid valve 64 is returned to the normal PID control algorithms assuming controller 60 is operating. If controller 60 has failed or is not powered, then application of power to the rest of cooling system 40 will cause all motors and vapor injection to run without delay. The PWM output will be off and compressor 44 will operate at 100% capacity with the vapor injection increasing the capacity to approximately 130%.

Pump Down

Controller 60 may include suction pressure sensor 176. When sensor 176 is included, pump down when an individual case 42 goes into defrost (stopping refrigerant flow) will generally not occur because the pressure control algorithm will reduce compressor capacity to maintain the suction pressure at set point 230. However, suction pressure sensor 176 is positioned in front of digital filter 232 and thus pressure sensor 176 can monitor excessively low suction pressure. Preferably, if instantaneous suction pressure goes below five PSIG, the compressor motor will be stopped immediately, and restart logic will be invoked. Preferably, the electromechanical low pressure cutout switch should be set to zero PSIG. In this manner, it will prevent vacuum but it will also allow suction pressure sensor 176 to prevent low pressure conditions. The electromechanical switch then becomes a backup control. When suction pressure sensor 176 is not included with controller 60, then controller 60 cannot prevent pump down. The external electromechanical low pressure cutout switch must control compressor 44 under such conditions. Restart logic (the delay) within controller 60 cannot be invoked.

High Discharge Temperature Compressor Protection

Conditions Detected—As shown in FIG. 8, cooling system 40 includes temperature sensor 222 which monitors the discharge temperature for compressor 44. Controller 60 includes two set points for the discharge gas temperature of compressor 44. Preferably, the Very High Discharge Temperature Condition (VHDTC) will be set to be true above 280 F. (138 C.) and false below 270 F. (132 C.). Preferably, the High Discharge Temperature Condition (HDTC) will be true above 260 F. (127 C.) and false below 250 F. (121 C.). These two set points are not adjustable. If a VHDTC is sensed as true (above 280 F.) for larger than fifteen seconds, the compressor motor will be turned off.

Vapor Injection During High Discharge Temperature—If the compressor motor is running and the HDTC is true but the VHDTC is false, the capacity for compressor 44 will be forced to 100% by ending the pulse width modulation for solenoid valve 64 and vapor injection solenoid 68 will be energized (or de-energized) to provide full vapor injection. Then, if the compressor motor is running and the HDTC returns to false (and the VHDTC remains false), the compressor capacity will return to normal control and vapor injection solenoid 68 will be de-energized (or energized) to end vapor injection. The ending of vapor injection assumes the compressor capacity is below 100%.

Automatic Restarts—As discussed above, an automatic restart will occur after the motor has been stopped and after a specified delay time. Controller 60 allows for an automatic restart but this automatic restart may be locked out, requiring a manual reset as detailed below. When the compressor motor is turned off due to high discharge temperature (as detailed above), controller 60 keeps a count of these High Discharge Temperature Shutdown Events (HDTSE). The HDTSE counter will be at zero until a HDTSE occurs. The counter will increment by one each time a HDTSE occurs at the time the condition is detected. A thirty minute high discharge temperature restart delay timer will be started each time a HDTSE occurs. When both the VHDTC and the HDTC are false (compressor 44 has cooled) and the temperature restart delay timer has completed its timing and if the counter is less than four, a motor restart will occur assuming controller 60 determines the need. The net effect is that only three automatic restarts are allowed after high discharge temperature events and these automatic restarts are allowed only after compressor 44 has cooled down as indicated by sensor 222 and the motor has not been running for thirty seconds. If a fourth HDTSE occurs, the motor will not automatically restart until the counter is manually reset to zero at controller 60. While a HDTSE is in progress, an error code will be displayed by controller 60. Preferably, E11 will indicate the first event, E12 will indicate the second event, E13 will indicate the third event and E14 will indicate the fourth event. For E11, E12 and E13, an automatic restart will occur. E14 indicates that a manual restart is necessary.

The counter for the high discharge temperature events will be retained through power outages. The state of the high temperature delay timer will be retained during power outages (to the nearest five minutes). The states of the HDTC and the VHDTC, if either is true, will also be retained during power outages. This information will be written to non-volatile memory at five minute intervals. Once both conditions are false and the thirty minute timer has expired, the writing of this information to the non-volatile memory will cease. This non-writing of information during normal operation of cooling system 40 avoids the "wearing out" of the non-volatile memory.

Manual Reset—The counter for the high discharge temperature events may be reset to zero any time, even if its count is less than four. Manual reset of the counter will clear both the count and any time remaining on the thirty minute delay timer. After a manual reset, the motor will restart only if (or after) the temperature of the discharge gas has decreased as sensed by sensor 222. This arrangement will allow factory test of the high temperature shutdown feature without undue time loss for delays and without wasting allowed automatic restarts. Preferably, controller 60 will include a separate push-button 250 (FIG. 10) for Manual Reset and push-button 250 must be pressed and held for two seconds to achieve manual restart. A yellow LED 252 beside push-button 250 indicates the need for a manual restart. LED 252 will be turned on when E14 is being displayed and LED 252 will turn off when the manual restart process has begun.

Operation With Failed Discharge Temperature Sensor—If discharge temperature sensor 222 appears to controller 60 to be disconnected or shorted out, this will constitute a detection of a failed sensor 222 and error code E04 will be displayed by controller 60. When sensor 222 failure is detected, controller 60 will continue to operate normally except that the capacity of compressor 44 will be limited to 75% and alarm 200 will be turned on. There will be no other compressor protection by sensor 222 under such conditions. However, compressors internal line break function for excessive temperature will still be active.

Condenser Fan Control

Condenser Fan Control Algorithm—As shown in FIG. 8, controller 60 operates two condenser fans 202 and 204. Fans 202 and 204 will be operated in a lead and lag fashion, with control based primarily on condensing temperature and partially upon the running capacity of compressor 44 and partially upon Saturated Suction Temperature (SST). The condenser fan control algorithm will use the following six test control fans 202 and 204. These values are chosen to preferably maintain at least seventy-five PSI pressure difference across compressor 44 to ensure good performance even at very low outdoor ambient and condensing temperatures. The condenser control algorithms do not have adjustable set points other than the type of refrigerant. In the tests below, SCT is Saturated Condenser Temperature, SST is Saturated Suction Temperature and CapC is the capacity of the compressor within limits for condenser 46.

1. Turn ON the LEAD condenser fan when
   $SCT > \{[SST-(40\ F.)] \times [0.5] + (+53\ F.)\}$
2. Turn ON the LAG condenser fan when
   $SCT > \{[SST-(40\ F.)] \times [0.5] - [CapC/100\%] \times [(+112\ F.) - (+32\ F.)] + (+113\ F.)\}$
3. Turn OFF the LAG condenser fan when
   $SCT < \{[SST-(-40\ F.)] \times [0.5] - [CapC/100\%] \times [(+112\ F.) - (+32\ F.)] + (+93\ F.)\}$
4. Turn OFF the LEAD condenser fan when
   $SCT < \{[SST-(-40\ F.)] \times [0.5] + (+33\ F.)\}$
5. Turn ON the LEAD condenser fan when
   $SCT > \{(+105\ F.)\}$
6. Turn ON the LAG condenser fan when
   $SCT > \{(+125\ F.)\}$ The above equations are written so that all of the Fahrenheit temperature values can be replaced with the equivalent Celsius temperature values and still produce the same control results. Controller 60 determines SCT by reading temperature sensor 218. SST is a calculated temperature that will be determined by converting the output of digital filter 232 (suction pressure) to a corresponding refrigerant vapor/liquid saturation temperature. If suction pressure sensor 176 is not included with controller 60, the lead case temperature reading from sensor 174 will be used. The sensed temperature minus 9 F. (5 C.) will be used as SST. CapC for the condenser fan control algorithm is equal to the capacity value currently driving capacity solenoid 64 except that CapC is limited to no less than 25% and no more than 50%. Fan control tests five and six above cause fans 202 and 204 to turn on at specific SCT maximum values regardless of other conditions to prevent excessive discharge pressures and temperature. This is a necessary backup operating mode for installations where suction pressure sensor 176 is not present and lead case temperature sensor 172 is being used to determine SST. In these installations defrosting of the lead case would cause controller 60 to turn fans 202 and 204 off allowing condenser temperature to rise. Tests five and six above override tests one through four.

Condenser Fan Delays—Preferably, each condenser fan 202 and 204 will stay on for sixty seconds after it starts and stay off for thirty seconds after it stops. This time delay prevents excessive fan cycling.

Condenser Fan Alternation—Which condenser fan leads and which one lags in the above described control scheme is alternated by a fan alternation timer. Preferably, the lead/lag fan is alternated about once every twenty hours. If at the time for alternation and only one fan is on, the alternation will not occur. The fan alternation timer will wait until the next time both fans are on or both fans are off to make the change. However, if the alternation favorable condition (both on or off) does not occur after a long period of time, then the change of lead and lag fans will be forced to happen. Preferably, an alternation suspend timer will run for five hours before forcing the change. The timer is started by timeout of the fan alternation timer (twenty hours) and it is reset by successful alternation of lead and lag fans. This alternation method reduces wear stress by evening out run time for each fan.

Operation With Failed Sensors—Normal condenser fan operation depends upon signals from two sensors. Normal condenser fan operation will be suspended and a backup control algorithm will take over if failure of a sensor used by the condenser control is detected. When there is a sensor failure affecting the condenser control, the lead fan will be on any time the compressor is running. The lag fan will turn on any time the compressor capacity exceeds 35% and turn off when the compressor capacity is below 25%.

One Condenser Fan—If there is just one condenser fan, the two condenser fan outputs of controller 60 must be connected in parallel to ensure that the single fan will always be the lead fan. There is no override provided for the periodic alternating between lead and lag.

Output States at Power Up—At initial power up, the compressor motor will run, capacity solenoid valve 64 will be de-energized (or energized) to provide a compressor capacity of 100% and both condenser fans 202 and 204 will be on. Controller 60 will initially be in a non-functional reset state immediately after power up. After controller 60 begins functioning, items which should not be on will be staged off, otherwise they will be left on. Capacity solenoid valve 64 will begin operating after controller 60 begins functioning. In addition, alarm 200 will be turned on until controller 60 begins functioning after which it will be turned off.

Suction Pressure Sensor Failure—If suction pressure set point 230 is not 99 and suction pressure sensor 176 appears to controller 60 to be disconnected, this will constitute a detection of a failed sensor 176 and an error code E01 will be displayed and alarm 200 will be turned on. The compressor capacity will be set at 100% and vapor injection solenoid 68 will be energized (or de-energized) to increase the capacity above 100%. Compressor 44 will remain in this state until the failed sensor condition is no longer detected. If suction pressure set point 230 is set to 99, this signals controller 60 that suction pressure control is not to be used and alarm 200 will not be turned on.

Lead Case Temperature Sensor Failure—If lead case temperature set point 234 is not 99 and lead case temperature sensor 174 appears to controller 60 to be either disconnected or shortened out, this will constitute a detection of a failed sensor 174 and an error code E02 will be displayed and alarm 200 will be turned on. The compressor capacity will be set at 100% and vapor injection solenoid 68 will be energized (or de-energized) to increase the capacity above 100%. Compressor 44 will remain in this state until the failed sensor condition is no longer detected. If lead case temperature set point 234 is set to 99, this signals controller 60 that lead case temperature control is not to be used and alarm 200 will not be turned on.

Condenser Temperature Sensor Failure—If condenser temperature sensor 218 appears to controller 60 to be disconnected or shorted out, this will constitute a detection of a failed sensor 218 and an error code E03 will be displayed and alarm 200 will be turned on.

Display

Figure 10:
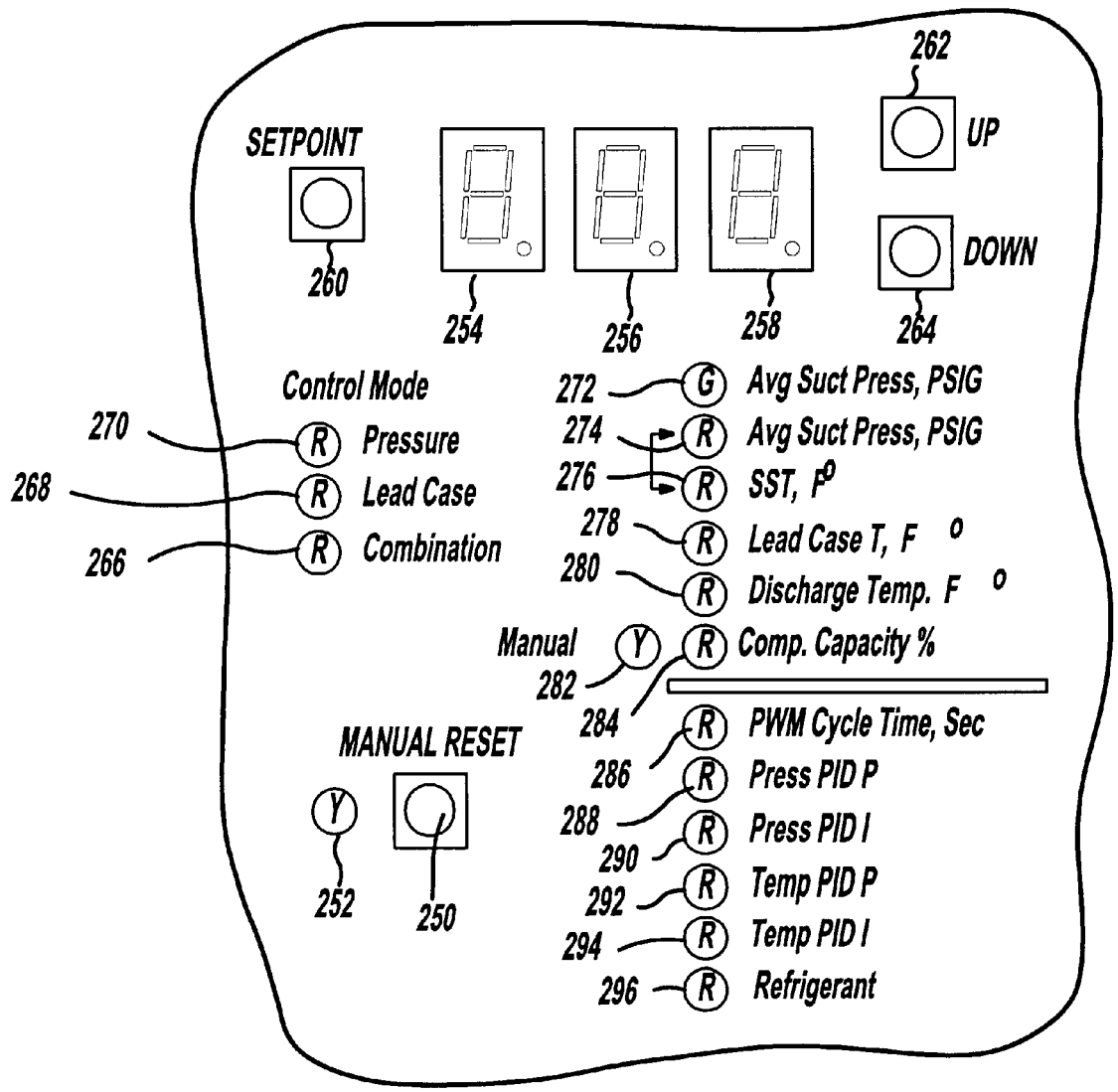
FIG. 10 is a plan view of the controls for the controller shown in FIGS. 7 and 8.

In order to keep controller 60 simple, the display will comprise three seven segment digits 254, 256 and 258; four push-buttons 250, 260, 262 and 264; and seventeen point lights 252 and 266–296, all Light Emitting Diodes as shown in FIG. 10.

Digits—Controller 60 displays the various set points and error codes discussed above using "seven segment" digits 254, 256 and 258. The illuminated part of digits 254–258 is preferably three-tenths of an inch high. The various error codes discussed above (E01 through E14) will be indicated on the display briefly along with the operating values. This display of error codes and values will continue to repeat if alarm 200 is turned on. Preferably, if there is one alarm condition, the error code will be shown for one-half second and the selected operating value will be shown for 1.95 seconds. If there are multiple alarm conditions, they will be shown in numerical order for 0.45 seconds each with the selected operating valve being shown for two seconds each. Each alarm code display time will be surrounded by a blank display for one-half second. This will achieve a flash effect to call attention to the alarm.

Point Lights (LED)—The seventeen point lights (LEDs) are either green, red or yellow in color. Each output will have a point light associated with it. Green point lights indicate that the item is display-only. Red point lights indicate that the item has a set point that can be changed. Yellow lights indicate manual mode and alarm. LED 252 is a yellow point light which indicates manual reset of the counter for auto restarts must be manually set. LED 266 is a red point light which indicates a combination control of suction pressure and lead case temperature control is being used. LED 268 is a red point light which indicates that LEAD case temperature control is being used. LED 270 is a red point light that indicates that suction pressure control is being used. (Only one of LEDs 266-270 will be lit at one time). LED 272 is a green point light which indicates that the display is showing the suction pressure directly from suction pressure sensor 176. LED 274 is a red point light which indicates that the display is showing the average suction pressure from digital filter 232. LED 276 is a red point light which indicates that the display is showing the calculated saturation temperature (SST) of the refrigerant. LED 278 is a red point light which indicates that the display is showing the lead case temperature. LED 280 is a green point light which indicates that the display is showing the discharge temperature based on sensor 222. LED 282 is a yellow point light which indicates that the display is showing the current compressor capacity in the manual mode. LED 284 is a red point light which indicates that the display is showing the current compressor capacity in the automatic mode. LED 286 is a red point light which indicates the display is showing the total time for one PWM cycle of solenoid valve 64. LEDS 288-294 are each red point lights which indicate that the display is showing the four constants detailed above under "Compressor Capacity Control Algorithms". LED 296 is a red point light which indicates that the display is showing the type of refrigerant being used.

Set Points

Various set points can be changed by operating push-buttons 260–264. The same push-buttons which select the display of operating values (262 and 264) will also select the underlying set points. Pushing these buttons will select the various set points and which set point is being displayed will be indicated by LEDS 272–296. The displayed value will be shown on digits 254–258. When a specific set point is being displayed, pressing and holding push-button 260 will then allow push-buttons 262 and 264 to decrease and increase, respectively, the value of the set point. If there is no associated set point with the operating value being displayed, then pushing push-button 260 will have no effect on buttons 262 and 264. All set points are maintained while power is off. The adjustable set points include Suction Pressure (LED 274), SST (LED 276), Lead Case Temperature (LED 278), Compressor Capacity (LEDs 282 and 284), PWM Cycle Time (LED 286), the four PID constants (LEDs 288–294) and the refrigerant type (LED 296).

Suction Pressure—This is the target average suction pressure to be achieved by the compressor. Setting this to 99 will disable the suction pressure control mode (LED 268 will lite) and controller 60 will assume pressure sensor 176 is not connected. Suction Pressure and SST are the views of the same set point assuming one adjusts the other.

SST—This is the calculated saturation temperature of the refrigerant. This is tied into suction pressure as indicated above.

Lead Case Temperature—This is the set point for lead case temperature. Setting it to 99 will disable the lead case temperature control mode (LED 270 will lite) and controller 60 will assume temperature sensor 174 is not connected. Setting both suction pressure and lead case temperature to lower values than 99 will cause the combination control mode to be used (LED 266 will lite).

Compressor Capacity—This allows for the manual mode of compressor 44 to be set. Merely selecting this item (LED 284) with buttons 262 or 264 will leave the control automatic under PID and the display will show the operating value of compressor capacity. Pressing and holding push-button 260 while this is selected (LED 284) will lock controller 60 at the capacity last calculated by the PID control loops and manual control of capacity will begin (LED 282 will lite, LED 284 will be turned off). The manual capacity may then be charged using push-buttons 262 or 264. Selecting a different set point using push-buttons 262 and 264 after releasing push-button 260 after changing the manual capacity allows observing of the operating values while in the manual PWM mode. Selecting a different set point and then pressing push-button 260 puts controller 60 back into the automatic mode.

PWM Cycle Time—This allows for the setting of the total time for one PWM cycle of capacity solenoid valve 64.

PID Pan I—These allow for the setting of the four constants described above for the PID constants under "Compressor Capability Control Algorithms".

Refrigerant—This allows for the setting of the type of refrigerant being used in the system. Preferably these choices are R-404A, R-407C, R-22, R-134a and R-140. These will be shown in the display as 404, 407, 22, 134 and 410, respectively. These settings allow for the proper conversion between pressure and temperature. Controller 60 will include all five refrigerant settings even if compressor 44 is not qualified initially for all five refrigerants.

Display Operating Values

Display Digits 254–258 on controller 60 can indicate any one of several operating values. Push-buttons 262 and 264 are used to scroll through the various operating values.

Instantaneous Suction Pressure (LED 272)—This LED indicates that the display is showing the suction pressure which is being read by suction pressure sensor 176. This will indicate the up and down swings of suction pressure during each unloader cycle.

Average Suction Pressure (LED 274)—This LED indicates that the display is showing the average suction pressure which is the output of digital filter 232. This will not indicate the swings in pressure due to operation of the unloader cycle.

Lead Case Temperature (LED 278)—This LED indicates that the current air temperature in the lead case is being displayed. This reading comes directly from temperature sensor 174.

Discharge Temperature (LED 280)—This LED indicates that the current compressor gas discharge temperature is being displayed. This reading comes directly from temperature sensor 222.

Compressor Capacity (LED 284)—This LED indicates that the current compressor running capacity is being displayed. This value is calculated by controller 60 and is used to operate capacity modulation generator 238, solenoid driver 240 and solenoid 64.

PWM Cycle Time (LED 286)—This LED indicates the current value for the PWM cycle time set point.

Operating Mode

As discussed above, controller 60 has a manual operating mode and an automatic operating mode. In the automatic mode, controller 60 will operate with capacity solenoid valve 64 controlled by the PID control loops. In the manual mode, compressor 44 will run with a constant fixed capacity. The capacity is set on controller 60 as detailed above. The condenser fan control and the compressor protection schemes will continue to operate in the manual mode just as in the automatic mode. The manual mode is intended for test purposes. Controller 60 will begin its operation in the automatic mode after a reset.

While the above detailed description describes the preferred embodiment of the present invention, it should be understood that the present invention is susceptible to modification, variation and alteration without deviating from the scope and fair meaning of the subjoined claims.

What is claimed is:

1. A compressor control system comprising:

a compressor that is selectively operable while energized in at least two states including a first state corresponding to a first capacity and a second state corresponding to a second capacity lower than said first capacity, said compressor operable to compress a gas between a suction pressure and a discharge pressure;

a pressure sensor for sensing said suction pressure; and a controller including motor start logic and coupled to said pressure sensor for producing a variable duty cycle control signal in which said duty cycle control signal is a function of said suction pressure, said controller being coupled to said compressor for unloading said compressor when initially energized and causing said compressor to selectively alternate between said first and second states in response to said variable duty cycle control signal, thereby adjusting capacity of said compressor based upon said suction pressure.

2. The compressor control system according to claim 1, wherein said controller determines an average suction pressure over a specified period of time within a control cycle time.

3. The compressor control system according to claim 1, further comprising a vapor injection system for injecting vapor into said compressor at a position intermediate said suction pressure and said discharge pressure, said controller being coupled to said vapor injection system for controlling injection of said gas.

4. The compressor control system according to claim 3, further comprising a temperature sensor for sensing a temperature of said gas at said discharge pressure, said controller being coupled to said temperature sensor for controlling injection of said vapor based on said temperature of said gas at said discharge pressure.

5. The compressor control system according to claim 1, wherein said compressor is a scroll compressor.

6. The compressor control system according to claim 1, wherein said compressor has two mechanical elements separated by a seal, said mechanical elements being movable relative to one another to develop fluid pressure and wherein said compressor includes mechanism to selectively break said seal in response to said control signal to thereby alter said fluid pressure developed while allowing said mechanical elements to maintain substantially constant relative movement with one another.

7. The compressor control system according to claim 6, wherein said compressor is a scroll compressor and said two mechanical elements are scroll members.

8. The compressor control system according to claim 1, wherein said motor start logic selects said second state of said compressor when said compressor is energized.

9. A cooling system comprising:
a housing;
an evaporator disposed in said housing;
a condenser coupled in fluid communication with said evaporator;
a compressor coupled in fluid communication with said evaporator and said condenser, said compressor comprising a gas between a suction pressure and a discharge pressure;
a temperature sensor for sensing temperature;
a pressure sensor for sensing said suction pressure; and
a controller responsive to said suction pressure sensor, said controller being coupled to said condensation fan for controlling said fan based on a temperature sensed by said temperature sensor, a percent duty cycle, and a calculated minimum pressure differential, and said controller being coupled to said compressor for providing a variable duty cycle control signal to said compressor whereby said compressor is modulated between a first capacity state and a second capacity state while operating to thereby adjust the operating capacity of said compressor based on said suction pressure to maintain a specified suction pressure.

10. The cooling system according to claim 9, further comprising a vapor injection system for injecting vapor into said compressor at a position intermediate a suction pressure and a discharge pressure, said controller being coupled to said vapor injection system for controlling injection of said gas.

11. The cooling system according to claim 10, further comprising a temperature sensor for sensing a temperature of gas at said discharge pressure, said system controller being coupled to said temperature sensor for controlling injection of said vapor based on said temperature of said gas at said discharge pressure.

12. The cooling system according to claim 9, wherein said compressor is a scroll compressor.

13. The cooling system according to claim 9, wherein said compressor has two mechanical elements separated by a seal, said mechanical elements being movable relative to one another to develop fluid pressure and wherein said compressor includes mechanism to selectively break said seal in response to said control signal to thereby alter said fluid pressure developed while allowing said mechanical elements to maintain substantially constant relative movement with one another.

14. The cooling system according to claim 13, wherein said compressor is a scroll compressor and said two mechanical elements are scroll members.

15. The cooling system according to claim 9, wherein said controller determines an average suction pressure over a specified period of time within a control cycle time.

16. The cooling system according to claim 9, further comprising a plurality of housings each having a respective evaporator disposed therein, and a temperature sensor disposed in one of said plurality of housings.

17. A compressor control system for a multiple compressor rack with at least one compressor having a pulse-width modulated capacity, said compressor control system comprising:
a pressure sensor for sensing a suction pressure of a gas; and
a system controller responsive to said suction pressure sensor including motor start logic and coupled to the at least one compressor for unloading said compressor when initially energized and providing a variable duty cycle control signal to the at least one compressor, whereby said at least one compressor is modulated between a first capacity state and a second capacity state while operating to thereby adjust the operating capacity of the at least one compressor based on said suction pressure to maintain a specified suction pressure.

18. The compressor control system according to claim 17, further comprising a vapor injection system for injecting vapor into the at least one compressor at a position intermediate a suction pressure and a discharge pressure, said system controller being coupled to said vapor injection system for controlling injection of said gas.

19. The compressor control system according to claim 18, further comprising a temperature sensor for sensing a temperature of said gas at said discharge pressure, said controller being coupled to said temperature sensor for controlling injection of said vapor based on said temperature of said gas at said discharge pressure.

20. The compressor control system according to claim 17, where in said system controller is coupled to a condenser fan to control the fan.

21. The compressor control system according to claim 17, wherein said system controller includes start logic, said start logic selecting said second capacity state of said at least one compressor when said at least one compressor is energized.

22. The compressor control system according to claim 17, further comprising an evaporator controller for controlling an evaporator and a temperature sensor connected to said evaporator controller, said temperature sensor communicating temperature data to said evaporator controller, and said evaporator controller communicating said temperature data to said system controller.

23. The compressor controller system according to claim 22, wherein said evaporator controller further communicates demand loading state data to said system controller.

24. The cooling system according to claim 17, wherein said system controller determines an average suction pressure over a specified period of time within a control cycle time.

25. A compressor control system comprising:
a multiple compressor rack with at least one compressor selectively operable while energized in at least two states including a first state corresponding to a first capacity and a second state corresponding to a second capacity lower than said first capacity, said at least one compressor operable to compress a gas between a suction pressure and a discharge pressure;
a pressure sensor for sensing said suction pressure; and
a controller including motor start logic and coupled to said pressure sensor for producing a variable duty cycle control signal in which the duty cycle control signal is a function of said suction pressure, said controller being coupled to said compressor for unloading said compressor when initially energized and causing said compressor to selectively alternate between said first and second states in response to said variable duty cycle control signal, thereby adjusting capacity of said at least one compressor based upon said suction pressure.

26. The compressor control system according to claim 25, wherein said controller determines an average suction pressure over a specified period of time within a control cycle time.

27. The compressor control system according to claim 25, further comprising a vapor injection system for injecting vapor into said compressor at a position intermediate said suction pressure and said discharge pressure, said controller being coupled to said vapor injection system for controlling injection of said gas.

28. The compressor control system according to claim 27, further comprising a temperature sensor for sensing a temperature of said gas at said discharge pressure, said controller being coupled to said temperature sensor for controlling injection of said vapor based on said temperature of said gas at said discharge pressure.

29. The compressor control system according to claim 25, wherein said compressor is a scroll compressor.

30. The compressor control system according to claim 25, wherein said compressor has two mechanical elements separated by a seal, said mechanical elements being movable relative to one another to develop fluid pressure and wherein said compressor includes mechanism to selectively break said seal in response to said control signal to thereby alter said fluid pressure developed while allowing said mechanical elements to maintain substantially constant relative movement with one another.

31. The compressor control system according to claim 30, wherein said compressor is a scroll compressor and said two mechanical elements are scroll members.

32. The compressor control system according to claim 25, wherein said motor start logic selects said second state of said compressor when said compressor is energized.

33. A cooling system comprising:
   a housing;
   an evaporator disposed in said housing;
   a condenser coupled in fluid communication with said evaporator;
   a compressor rack coupled in fluid communication with said evaporator and said condenser, said compressor rack including at least one compressor having a pulse-width modulated variable capacity and being operable between two states;
   a pressure sensor for sensing a suction pressure of a gas;
   a system controller responsive to said suction pressure sensor including motor start logic and coupled to the at least one compressor for unloading said compressor when initially energized and providing a variable duty cycle control signal to the at least one compressor, whereby said at least one compressor is modulated between a first capacity state and a second capacity state while operating to thereby adjust the operating capacity of the at least one compressor based on said suction pressure to maintain a specified suction pressure.

34. The cooling system according to claim 33, wherein said at least one compressor compresses said gas between a suction pressure and a discharge pressure, and said cooling system further comprises a temperature sensor for sensing a temperature in said housing, said system controller being coupled to said temperature sensor for controlling said capacity of said compressor based on said suction pressure and said temperature within said housing.

35. The cooling system according to claim 33, wherein said at least one compressor is a scroll compressor.

36. The cooling system according to claim 33, wherein said at least one compressor has two mechanical elements separated by a seal, said mechanical elements being movable relative to one another to develop fluid pressure and wherein said at least one compressor includes mechanism to selectively break said seal in response to said control signal to thereby alter said fluid pressure developed while allowing said mechanical elements to maintain substantially constant relative movement with one another.

37. The cooling system according to claim 36, wherein said at least one compressor is a scroll compressor and said two mechanical elements are scroll members.

38. The cooling system according to claim 33, wherein said system controller determines an average suction pressure over a specified period of time within a control cycle time.

39. The cooling system according to claim 33, further comprising a plurality of housings each having a respective evaporator disposed therein, said temperature sensor being disposed in at least one of said housings.

40. The cooling system according to claim 33, further comprising a plurality of housings, each having an evaporator, an evaporator controller, and a temperature sensor in each of said plurality of housings, each said temperature sensor connected to said evaporator controller in said each of said plurality of housings, each said evaporator controller communicating temperature sensor and demand loading state values to said system controller.

41. A compressor control system, comprising:
   a multiple compressor rack with at least one compressor having a pulse-width modulated capacity;
   a pressure sensor for sensing suction pressure of gas; and
   a system controller responsive to said suction pressure sensor including motor start logic and coupled to said at least one compressor for unloading said compressor when initially energized and providing a variable duty cycle control signal to said at least one compressor, said at least one compressor being modulated between a first capacity state and a second capacity state while operating to adjust the operating capacity of the at least one compressor based on said suction pressure to maintain a specified suction pressure.

42. The compressor control system according to claim 41, wherein said multiple compressor rack includes at least two compressors having a pulse width modulated capacity.

43. The compressor control system according to claim 41, further comprising a vapor injection system for injecting vapor into the at least one compressor at a position intermediate a suction pressure and a discharge pressure, said system controller being coupled to said vapor injection system for controlling injection of said gas.

44. The compressor control system according to claim 42, further comprising a temperature sensor for sensing a temperature of said gas at said discharge pressure, said controller being coupled to said temperature sensor for controlling injection of said vapor based on said temperature of said gas at said discharge pressure.

45. The compressor control system according to claim 41, wherein said system controller is coupled to a condenser fan to control the fan.

46. The compressor control system according to claim 1, wherein said motor start logic selects said second capacity state of said at least one compressor when said at least one compressor is energized.

47. The compressor control system according to claim 41, further comprising an evaporator controller for controlling an evaporator and a temperature sensor connected to said evaporator controller, said temperature sensor communicating temperature data to said evaporator controller, and said evaporator controller communicating said temperature data to said system controller.

48. The compressor controller system according to claim 47, wherein said evaporator controller further communicates demand loading state data to said system controller.

49. The cooling system according to claim 41, wherein said system controller determines an average suction pressure over a specified period of time within a control cycle time.

* * * * *

UNITED STATES PATENT AND TRADEMARK OFFICE
CERTIFICATE OF CORRECTION

PATENT NO. : 6,601,397 B2
DATED : August 5, 2003
INVENTOR(S) : Hung M. Pham et al.

It is certified that error appears in the above-identified patent and that said Letters Patent is hereby corrected as shown below:

Column 4,
Line 3, "it" should be -- if --.

Column 16,
Lines 26 and 39, "LEDS" should be -- LEDs --.

Column 22,
Line 29, (second occurrence), "the" should be -- said --.
Line 49, "1" should be -- 41 --.

Signed and Sealed this

Twenty-ninth Day of June, 2004

JON W. DUDAS
*Acting Director of the United States Patent and Trademark Office*